(12) United States Patent
Lawlor et al.

(10) Patent No.: US 11,170,485 B2
(45) Date of Patent: Nov. 9, 2021

(54) METHOD, APPARATUS, AND SYSTEM FOR AUTOMATIC QUALITY ASSESSMENT OF CROSS VIEW FEATURE CORRESPONDENCES USING BUNDLE ADJUSTMENT TECHNIQUES

(71) Applicant: HERE GLOBAL B.V., Eindhoven (NL)

(72) Inventors: David Johnston Lawlor, Chicago, IL (US); Anish Mittal, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 71 days.

(21) Appl. No.: 16/419,907

(22) Filed: May 22, 2019

(65) Prior Publication Data

US 2020/0372623 A1 Nov. 26, 2020

(51) Int. Cl.
*G06T 7/00* (2017.01)
*G06T 7/70* (2017.01)
*G01C 21/36* (2006.01)

(52) U.S. Cl.
CPC ........ *G06T 7/0002* (2013.01); *G01C 21/3602* (2013.01); *G06T 7/70* (2017.01); *G06T 7/97* (2017.01); *G06T 2207/10032* (2013.01); *G06T 2207/30168* (2013.01); *G06T 2207/30181* (2013.01)

(58) Field of Classification Search
None
See application file for complete search history.

(56) References Cited

U.S. PATENT DOCUMENTS

| | | | |
|---|---|---|---|
| 7,747,151 B2* | 6/2010 | Kochi | G01C 11/06 396/55 |
| 9,940,717 B2 | 4/2018 | Grau | |
| 2005/0147324 A1* | 7/2005 | Kwoh | G01C 11/00 382/293 |
| 2018/0157920 A1* | 6/2018 | Hu | B60R 1/00 |
| 2019/0049242 A1* | 2/2019 | Adams | G01C 25/00 |
| 2019/0259170 A1* | 8/2019 | Qi | G06T 7/73 |
| 2020/0160068 A1* | 5/2020 | Silver | G01C 21/3833 |
| 2020/0372285 A1* | 11/2020 | Adams | G06K 9/00798 |

OTHER PUBLICATIONS

Hess-Flores et al., "Iterative Dense Correspondence Correction Through Bundle Adjustment Feedback-based Error Detection", May 2010, 6 pages.
James, "SFM-MVS Photoscan Image Processing Exercise", Oct. 2017, 24 pages.

* cited by examiner

*Primary Examiner* — Leon Viet Q Nguyen
(74) *Attorney, Agent, or Firm* — Ditthavong, Steiner & Mlotkowski

(57) ABSTRACT

An approach is provided for determining quality assessment of cross view feature correspondence using bundle adjustment techniques. The approach, for example, involves retrieving a plurality of annotated images that are labeled with one or more feature correspondence labels. The approach also involves performing a bundle adjustment process on the plurality of annotated images to compute a three-dimensional (3D) location and a residual error of a feature corresponding to the one or more feature correspondence labels. The approach further involves flagging the one or more feature correspondence labels as potentially incorrect based on determining that the residual error is greater than an error threshold.

17 Claims, 21 Drawing Sheets

METHOD, APPARATUS, AND SYSTEM FOR AUTOMATIC QUALITY ASSESSMENT OF CROSS VIEW FEATURE CORRESPONDENCES USING BUNDLE ADJUSTMENT TECHNIQUES

BACKGROUND

Modern location-based services and applications (e.g., autonomous driving) are increasingly demanding highly accurate and detailed digital map data (e.g., centimeter-level accuracy or better). To achieve such levels of accuracy, map service providers have traditionally used ground control points (e.g., identifiable points or features that have known location coordinates) to precisely align and/or correct digital map data from different sources (e.g., image data, LiDAR point cloud data, etc.). Service providers, for instance, can identify and label ground control points or other features in the different sources, images, etc. to determine feature correspondences for mapping and/or providing other location-based services and applications. Consequently, the accuracy of the labeling of the ground control points or features in images used for feature correspondence can have a significant impact on the accuracy of the products and services derived from labeled ground control points. Traditionally, quality assurance of the labeling of ground control points has been done manually (e.g., to ensure that the same feature or ground control point is correctly labeled across different images or sources). This traditional approach, however, is labor intensive and does not scale well when available manual resources are limited. Accordingly, map service providers face significant technical challenges to automatically assess the quality of the labeling of ground control points.

Some Example Embodiments

Therefore, there is a need for an approach for automatic quality assessment of ground control points using bundle adjustment techniques.

According to one embodiment, a computer-implemented method for providing quality assurance of annotated image data (or other sensor data) comprises retrieving a plurality of annotated images that are labeled with one or more feature correspondence labels. The method also comprises performing a bundle adjustment process on the plurality of annotated images to compute a three-dimensional (3D) location and a residual error of a feature (e.g., a ground control point) corresponding to the one or more feature correspondence labels. The method further comprises flagging the one or more feature correspondence labels as potentially incorrect based on determining that the residual error is greater than an error threshold.

According to another embodiment, an apparatus for providing quality assurance of annotate image data comprises at least one processor, and at least one memory including computer program code for one or more programs, the at least one memory and the computer program code configured to, with the at least one processor, cause the apparatus to retrieve a plurality of annotated images that are labeled with one or more feature correspondence labels. The apparatus is also caused to perform a bundle adjustment process on the plurality of annotated images to compute a three-dimensional (3D) location and a residual error of a feature corresponding to the one or more feature correspondence labels. The apparatus is further caused to flag the one or more feature correspondence labels as potentially incorrect based on determining that the residual error is greater than an error threshold.

According to another embodiment, a non-transitory computer-readable storage medium for providing quality assurance of annotate image data, carrying one or more sequences of one or more instructions which, when executed by one or more processors, cause, at least in part, an apparatus to retrieve a plurality of annotated images that are labeled with one or more feature correspondence labels. The apparatus is also caused to perform a bundle adjustment process on the plurality of annotated images to compute a three-dimensional (3D) location and a residual error of a feature corresponding to the one or more feature correspondence labels. The apparatus is further caused to flag the one or more feature correspondence labels as potentially incorrect based on determining that the residual error is greater than an error threshold.

According to another embodiment, an apparatus for providing quality assurance of annotate image data comprises means for retrieving a plurality of annotated images that are labeled with one or more feature correspondence labels. The apparatus also comprises means for performing a bundle adjustment process on the plurality of annotated images to compute a three-dimensional (3D) location and a residual error of a feature corresponding to the one or more feature correspondence labels. The apparatus further comprises means for flagging the one or more feature correspondence labels as potentially incorrect based on determining that the residual error is greater than an error threshold.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for automatic quality assessment of cross view feature correspondence using bundle adjustment techniques are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
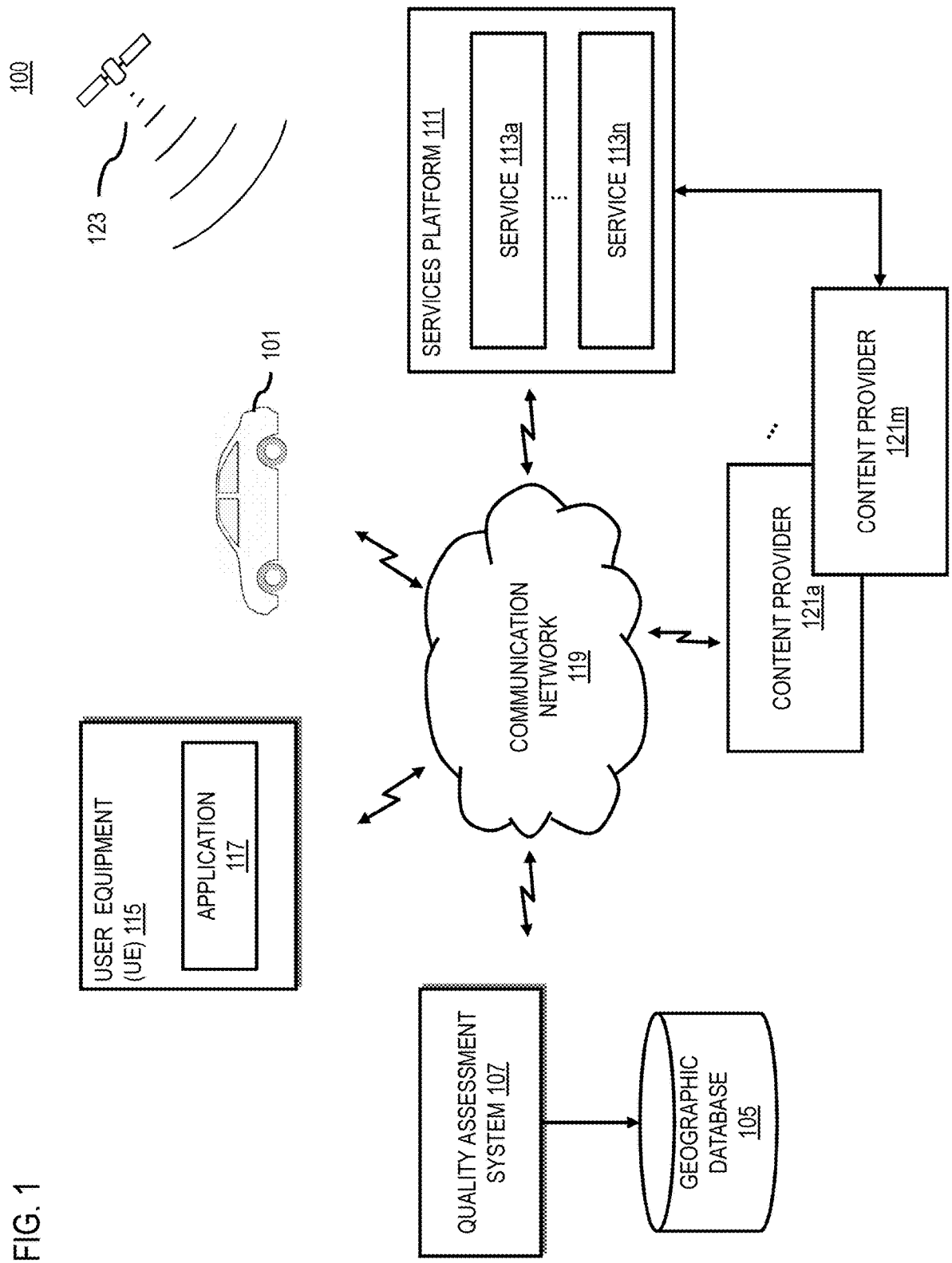
FIG. 1 is a diagram of a system capable of automatic quality assessment of annotated image data using bundle adjustment techniques, according to one embodiment.

FIG. 1 is a diagram of a system capable of automatic quality assessment of annotated image data using bundle adjustment techniques, according to one embodiment. As indicated above, many location-based services and applications rely on accurate map data. For example, automated driving is quickly becoming a reality following advances in machine learning, computer vision, and compute power. The ability to perceive the world with an accurate semantic understanding enables vehicles (e.g., an autonomous vehicle 101) to obey driving rules and avoid collisions. As these perceptual abilities have improved, so too has the need for highly accurate and up-to-date maps. Path planning, for instance, requires knowledge of what to expect beyond a vehicle 101's perceptual horizon, and driving in complicated urban environments with many occluding objects requires knowledge of what cannot be detected by onboard sensors.

In response, map service providers are creating the most accurate and up-to-date high-resolution map for automated driving (e.g., a geographic database 105). To facilitate the accuracy of digital map data stored in the geographic database 105, map service providers can designate ground control points that can be used to accurately align or locate image data or other sensor data (e.g., LiDAR point clouds) to generate accurate maps. In one embodiment, ground control points are defined as identifiable points on the Earth's surface that have precise location (e.g., in the form of <Latitude, Longitude, Elevation>) associated with them. Ground control points are often used in the geospatial community as ground truth or reference data for measuring the accuracy of geographic data products. In addition, ground control points are critical for geospatially correcting a range of other data sources (e.g., aerial/satellite imagery, satellite-based positions (e.g., GPS, GNSS, etc.), etc.).

For example, ground control points or similar features find applications in camera pose refinement of satellite, aerial and ground imagery, and hence provide for increased position fidelity for location data determined from these data sources. The increased position fidelity, for instance, results from the high accuracy of the known location of the ground control points (e.g., determined by high accuracy location sensors, surveying equipment, etc.). For example, personnel can be deployed in the field to collect the precise location of the points or features of interest. In turn, any derived products like building polygons, map objects made from these data sources inherit the accuracy. In addition, ground control points can also serve the localization of the automated car use case where they can be geocoded localization objects that a car (e.g., a vehicle 101) can measure its position with respect to.

In many of these use cases, the transfer of position fidelity or accuracy often relies on accurate labeling of the ground control points in sensor data (e.g., labeling of pixels in image data, points in LiDAR point cloud data, etc.). This is because the ground control point or feature locations themselves are taken as ground truth, but the points must still be accurately labeled in images or other sensor data in order to transfer the ground control point's known location accurately. In a typical labeling process, an annotator (e.g., human or machine annotator) will review images or other sensor data to identify the pixels or points that correspond to the feature (e.g., ground control point) that is be labeled. Feature labels are then used to flag the identified pixels or points. As noted, ground control points can be designated using manual and automatic methods. Manual designation or labeling of ground control points usually involves a particularly complex designation method of cross view correspondence identification. Cross view correspondence identification is a mentally demanding task that requires the individual to compare images of the same geographic region and identify matching points across a collection of images. The collection of images may be between five to ten images and include many different perspectives of the area of interest. Additionally, many of the areas of interest are complicated intersections. All these factors lead to a likelihood that mistakes will be made in designating the ground control points or similar features, thereby leading to incorrect positioning of the elements depicted in the mislabeled image or sensor data. Automated methods of designation deal with the same complex variables resulting in similar mistakes in ground control point designation.

For high definition map use (e.g., with centimeter level accuracy), incorrect ground control point labeling can influence the accuracy of digital maps. Traditionally, quality assurance of the labeling of ground control points has been completed entirely manually. Quality assurance using traditional means requires a substantial amount of infrastructure and manual resources. Because of the infrastructure and resource burden, the process of ensuring the accuracy of the labeling of ground control points using traditional means is not scalable when used in large-scale map making and evaluation processes. Accordingly, map service providers face significant technical challenges to automatically assess the quality of the labeling of ground control points or features that can scale given limited available resources.

To address these technical challenges and problems, the system 100 of FIG. 1 introduces a capability for automatic quality assessment of cross view feature correspondence using bundle adjustment techniques. Bundle adjustment, for instance, refers to estimating the three-dimensional (3D) coordinates of the same ground control point or other map feature that is labeled in multiple images depicting the ground control point or map feature from different perspectives or views based on the scene geometry of each image as computed from the respective camera locations, camera poses (e.g., pointing direction), camera optical characteristics, and/or the like. In one embodiment, the system 100 can process annotated images, which designate ground control points or map features, to estimate their respective 3D coordinates from each processed image using bundle adjustment or other equivalent process to triangulate the real-world locations of the labeled ground control point or feature.

The system 100 can also use the bundle adjustment process to compute the error or residuals the 3D coordinates or locations computed for the ground control points or features from the annotated image to automatically assess the quality of the labeling of the ground control point or feature in the processed images. For example, the system 100 can flag images or labels within those images for further investigation or quality control if the computed error or residual is above a threshold value or is otherwise an outlier from previously observed residuals. In other words, the system 100 can automatically flag the set of annotated images as potentially being mislabeled with respect to a ground control point if the residual error for the 3D location of the ground control point (e.g., as determined by bundle adjustment) is greater than or is an outlier from errors observed for similar images.

In one embodiment, only the flagged images or labels are fed into a quality assurance process to advantageously the reduce the resources needed for quality assurance. In this way, traditional manual quality assurance be reserved only for the images that have been flagged as having a higher than expected residual error from a bundle adjustment process, according to the embodiments described herein. These resources that have been reduced, for instance, include both (1) computing resources in terms of processing power, memory requirements, bandwidth requirements; and (2) manual resources in terms of manual labor hours to inspect and investigate potential quality issues in the annotated or labeled images. Other advantages of the embodiments described herein over traditional approaches can include but is not limited to: (1) increased reliability of quality assessments based on using a consistent quantitative metric (e.g., residuals from the bundle adjustment process), (2) increased accuracy again based on a consistent quantitative metric, (3) increased efficiency and decreased time taken for quality assessment by using automated means, and (4) decreased manual resource requirements based on requiring fewer human quality assessors to perform manual quality assurance.

In one embodiment, annotated images used in the embodiments described herein can be obtained from different sources that provide different views or perspectives of a geographic area in which the ground control point or feature is located. For example, image sources can include, but not limited to, (1) aerial sources (e.g., satellites, airplanes, drones, and/or other aerial vehicles) which capture images from a top-down perspective, and/or (2) ground level sources (e.g., vehicles 101 with mounted cameras traveling along surface streets, infrastructure cameras, etc.) which capture images from a street-level perspective. The system 100 can then be used to automatically determine which ground control points are accurately designated and which ground control points are improperly designated. In addition, although the various embodiments are described herein with respect to feature labeling of image data, it is contemplated that embodiments are also applicable to providing automated quality assurance for any type of sensor data (e.g., LiDAR point cloud data) for which a bundle adjustment process can be used to triangulate the 3D position of a labeled feature or ground control point.

Figure 2:
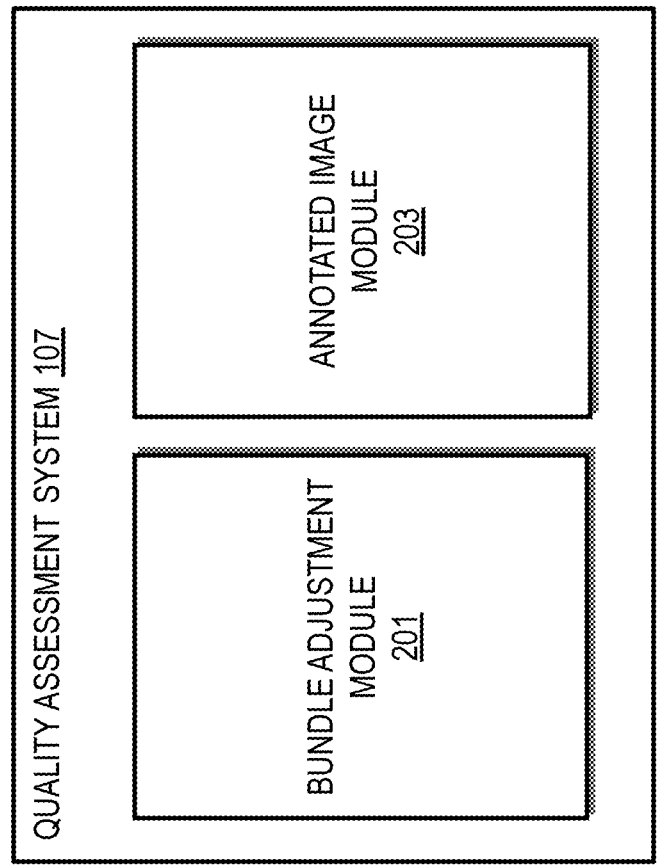
FIG. 2 is a diagram of components of a bundle adjustment system capable of determining quality assessments of annotated image data, according to one embodiment.

In one embodiment, the system 100 includes a quality assessment system 107 for providing automatic quality assessment of the labeling of ground control points or features. FIG. 2 is a diagram of components of the quality assessment system 107 according to one embodiment. It is contemplated that the functions of these components may be combined or performed by other components of equivalent functionality. In this embodiment, the quality assessment system 107 includes a bundle adjustment module 203 and an annotated image module 203. The above presented modules and components of the quality assessment system 107 can be implemented in hardware, firmware, software, or a combination thereof. Though depicted as a component of the quality assessment system 107, it is contemplated that bundle adjustment module 203 and an annotated image module 203 may be separate entities or may be implemented as a module of any other component of the system 100 (e.g., a component of the services platform 111, services 113a-113n (also collectively referred to as services 113), vehicle 101, a user equipment (UE) 115, application 117 executing on the UE 115, etc.). In another embodiment, one or more of the modules 201-203 may be implemented as a cloud based service, local service, native application, or combination thereof. The functions of the quality assessment system 107 and the modules 201-203 are discussed with respect to FIGS. 3-8 below.

Figure 3:
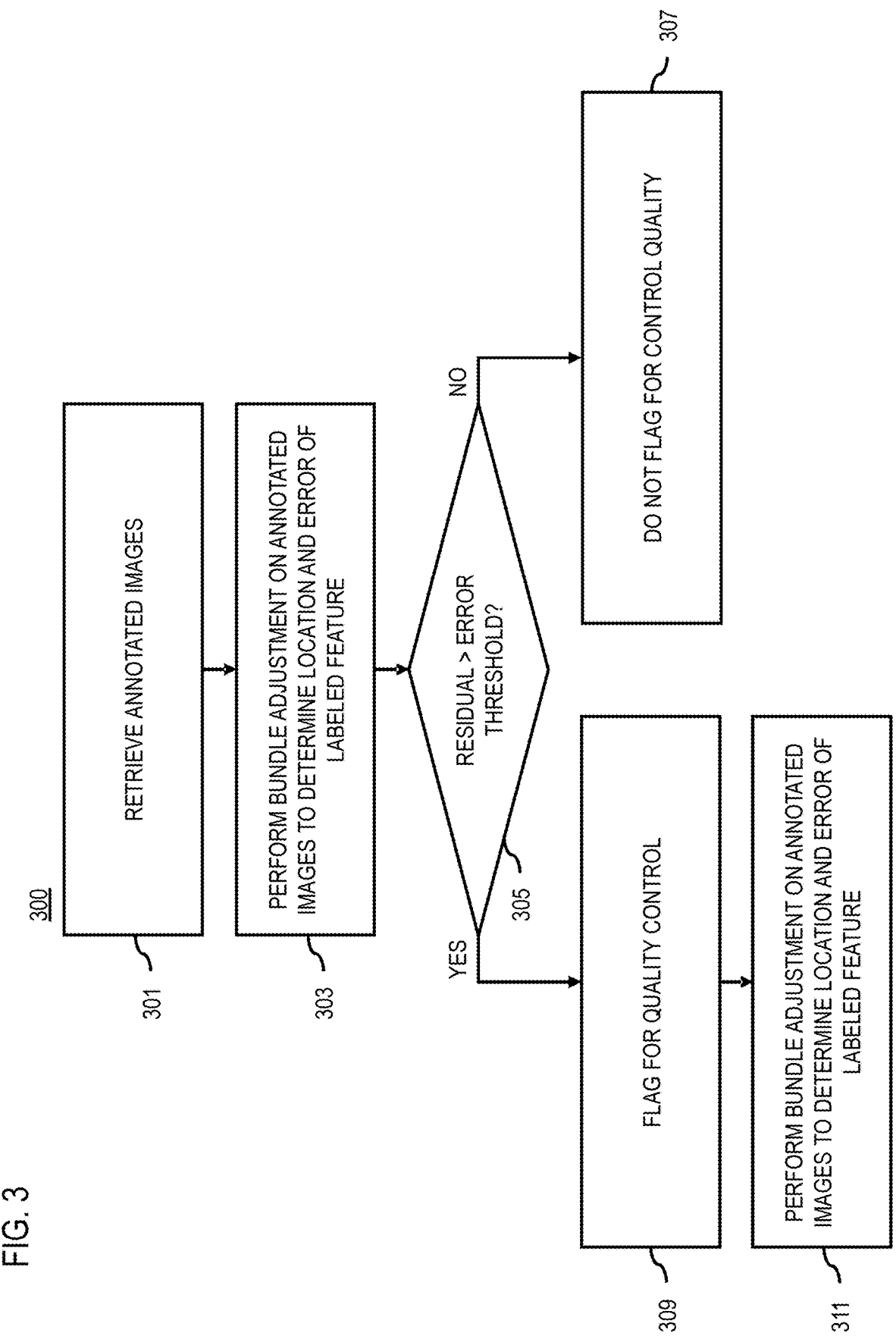
FIG. 3 is a flowchart of a process for determining quality assessments of annotated image data, according to one embodiment.
Figure 14:
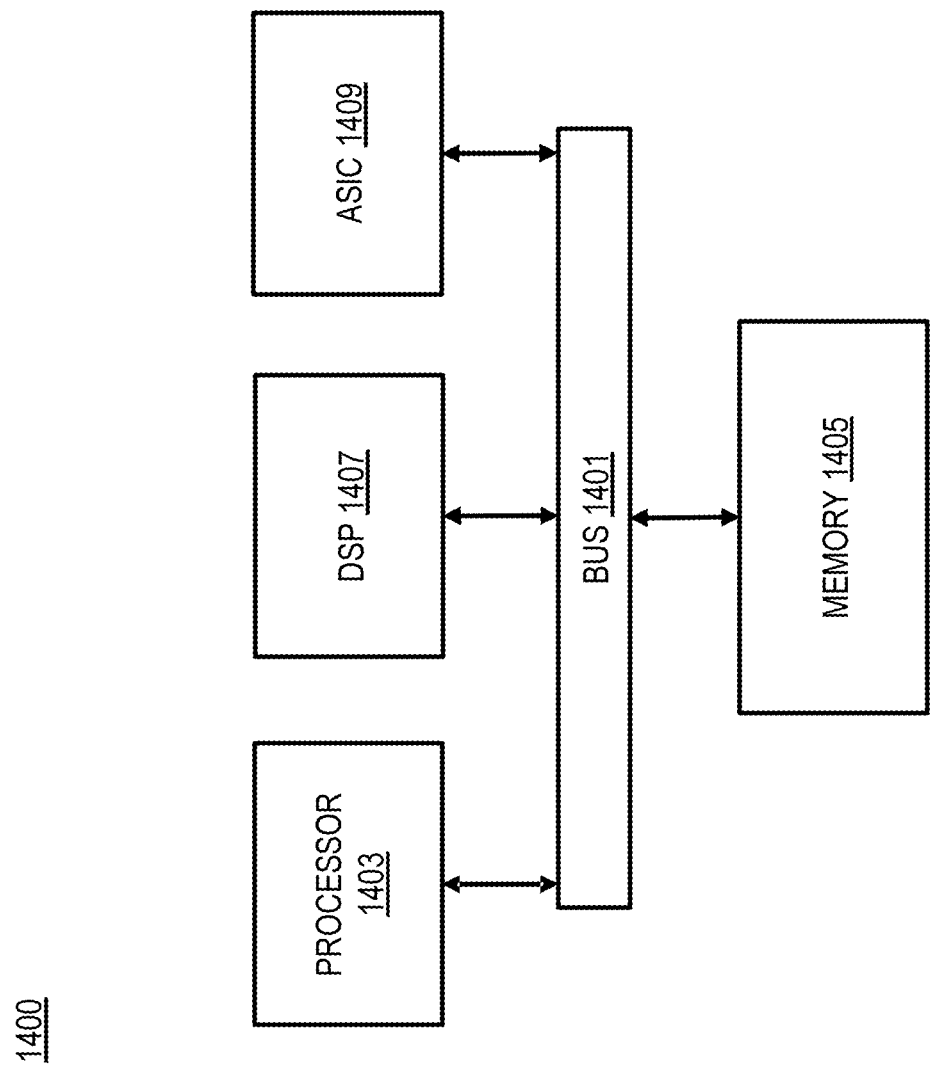
FIG. 14 is a diagram of a chip set that can be used to implement an embodiment.

FIG. 3 is a flowchart of a process 300 for determining the quality assessment of designated ground control points from annotated images, according to one embodiment. In various embodiments, the quality assessment system 107 and/or any of the modules 201-203 of the quality assessment system 107 may perform one or more portions of the process 300 and may be implemented in, for instance, a chip set including a processor and a memory as shown in FIG. 14. As such, the quality assessment system 107 and/or the modules 201-203 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the annotated image module 201 selects or retrieves a plurality or set of annotated images that are labeled with one or more feature correspondence labels. In one embodiment, the annotated images can be received as a part of an automated quality assurance process at the end of an image annotation pipeline. The set of annotated images are labeled with the same feature(s) (e.g., a ground control point) to indicate a feature correspondence between the images within the set. For example, the images (e.g., retrieved from a user; system administrator; image database—e.g., provided by the services platform 111, services 113, or content providers 121; etc.) can have annotated locations of a feature of interest. The images are taken by a respective cameras (e.g., with known camera location, camera pose/pointing direction, optical characteristics, and/or any other camera parameter for performing bundle adjustment or other equivalent location triangulation). By way of example, the annotated locations refer to pixels or locations in the images that have been labeled or annotated as corresponding to the feature(s) of interest. Features refer to any feature that is photo-identifiable in the image including, but not limited to, physical features on the ground that can be used as possible candidates for ground control points. In other words, it is contemplated that features refer to a broader category of photo-identifiable features than just control ground points. Accordingly, as used herein, references to either feature or ground control point individually is intended to also refer to the other un-mentioned term (e.g., feature or ground control point) alone or in combination.

In one embodiment, the images can be annotated to indicate feature correspondence labels using manual and/or automated processes. A manual process, for instance is described above. For an automated feature labeling process, the annotated image model 201 can use a machine-learning algorithm or equivalent to determine the annotated location of the feature of the feature of interest. The machine-learning algorithm can use one or more designated properties in classifying the feature in the image and/or determining the annotated location of the classified or detected feature. For example, for either the manual or automatic labeling approaches, the designated properties for selecting a feature such as a ground control point can include but are not limited to: (1) having a consistent definition, (2) being uniquely identifiable, (3) having spatial sparsity, (4) having curvilinear geometry intersection features and/or (5) being generalizable across different geographic regions. Curvilinear geometry intersection features are features defined by lines, markings, structures, etc. that are found at roadway intersections. The features can also include any geometric arrangement of the features (e.g., line intersections, angles, boundaries, etc.).

In one embodiment, the features are those features or geometric arrangements of the features that are visible in the imagery. The imagery (e.g., the first image and other images in the set of images being processed) may be have different perspectives including, but not limited to, street-level and top-down perspectives. In another embodiment, the different perspectives of the images can be based on different camera locations and/or pointing direction (e.g., two street-level images taken from different locations). Street-level imagery refers to images or image data that is taken at the street level (i.e., using an image collecting automobile). Top-down imagery refers to images or image data that are captured from an overhead or aerial perspective so that the camera is pointed down towards the intersection or ground level from an overhead height. The axis of the pointing direction of the camera can vary from a direct overhead (e.g., perpendicular angle) or to an oblique angle from either side. In one embodiment, the images can be associated with camera parameter or other related metadata associated with the captured image, subject of the image, other contextual parameters, and/or the like. For example, camera parameter data refers to the camera pose, position data, time of photo, other camera attributes (e.g., focal length, camera type, other optical characteristics, etc.) and/or environmental attributes (e.g., weather, time of day, etc.). In addition, different image sources (e.g., satellites, airplanes, drones, etc.) provide imagery with different qualities and resolutions. In one embodiment the retrieved images include camera parameter data of the respective one or more cameras used to capture the images. In another embodiment, the annotated image module 201 already knows and has stored the camera parameter data for the respective cameras.

In step 303, the bundle adjustment module 203, performs a bundle adjustment process on the plurality of annotated images being evaluated to compute a three-dimensional (3D) location and a residual error of a feature (e.g., ground control point) corresponding to the one or more feature correspondence labels in the annotated images. For example, the bundle adjustment process uses the set images with annotated locations of the feature and solves for the 3D coordinates of the feature using the respective camera parameters for each image (e.g., camera location, camera pose or pointing direction, optical characteristics, etc.).

More specifically, the bundle adjustment module 203 reconstructs or predicts the 3D location of the feature by projecting rays from a camera location thorough a 2D image plane of at the feature-labeled pixel location on each image. The intersection point or closest point to all of the rays behind the 2D image plane can be used as an initial estimate of the 3D location of the feature. This initial 3D location can then be optimized to determine the predicted 3D location of the image. The optimization process involves minimizing the reprojection error of the predicted 3D location back onto each of the 2D image planes. The residual error value can then be based on minimizing the differences between the reprojected 2D feature location and the labeled 2D feature location on each of the annotated images. In other words, the bundle adjustment process minimizes an error range of a two-dimensional (2D) projection of the feature into each of the plurality of annotated based on the computed 3D location, and wherein the residual error is based on the minimized error range.

Under ideal conditions of no error, the projection of the feature and the annotated location of the feature should match exactly so that the projected location and the annotated location should be overlapping. Differences in the projected location and the annotated location is representative of the overall error in predicting the 3D location of the feature from the images.

In step 305, the bundle adjustment module 203 determines whether the computed residual error of the predicted 3D location (e.g., resulting from the bundle adjustment process of step 303) is above an error threshold. It is noted that this bundle adjustment residual error can encompass all sources of error and is not limited to just the error from mislabeling of features or ground control points. For example, other sources of error can include but is not limited sensor error, camera location error, camera pose error, error based on image resolution, and/or the like. Therefore, even without feature labeling error, there can be a baseline residual error associated with the bundle adjustment process. Because of this potential baseline error, the bundle adjustment module 203 can compare the computed residual to an error threshold that accounts for baseline error by setting the error threshold to a value above the baseline error or above a value that would make the observed residual error an outlier from errors observed for similar images. In other words, in one embodiment, the error threshold can represent the cutoff value that will used to classify whether the feature labeling of the set images will be classified as a quality outlier.

In step 307, if the computed residual error is below the error threshold, the evaluated images will not be flagged for additional quality assurance or investigation. However, if the residual error value resulting from the bundle adjustment process has a residual error greater than the threshold, the one or more feature correspondence labels in the annotated images and/or the set of annotated images will be flagged as outliers indicating potentially incorrect feature correspondence labeling.

In one embodiment, the entire set of images can be flagged as having potentially incorrect labeling. In addition or alternatively, the bundle adjustment module 203 more specifically determine which image of the set of annotated images is the source of the residual error by computing and comparing respective residual errors for one or more subsets of the set of annotated images. For example, in a set of annotated images including three images A, B, and C, the bundle adjustment module 201 may perform the process 300 to determine that the residual error for a feature labeled in images A, B, and C has a residual error greater than the error threshold, but would not know which of the images A, B, or C are mislabeled. To help identify the potentially mislabeled image, the bundle adjustment module 203 can determine residual errors for different combinations of pairs of the images (e.g., A&B, B&C, and A&C). If, for instance, the bundle adjustment process determines that the residual error for image pair A&B is less than the error threshold while the residual errors for pairs B&C and A&C are above the threshold, the bundle adjustment module 201 can determine that the source of the residual error is likely image C. This is because each pair that contains image C is an outlier. Therefore, it is likely that if there is a mislabeled feature, that mislabeling will be found in image C.

In step 311, the bundle adjustment module 203, provides the flagged feature correspondence labels and/or images as an output for performing quality assurance or further investigation. For example, the bundle adjustment module 203 can provide the output in quality assurance user interface that includes a listing of feature correspondence images for which the computed residual error for labeled features are above a threshold. In another example, the bundle adjustment module 203 can provide a user interface presenting the flagged images for labeling verification and editing as needed.

Figure 4:
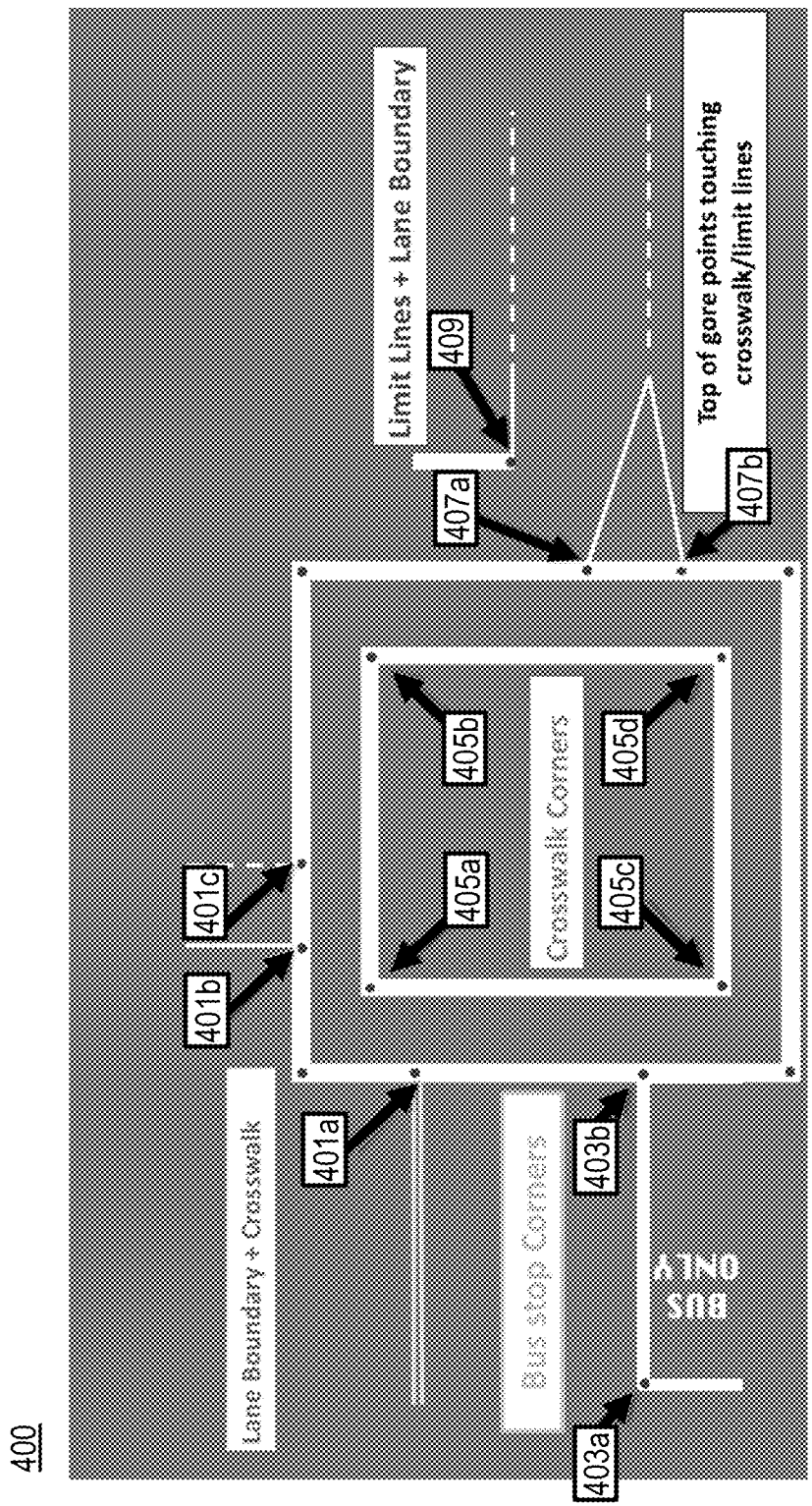
FIG. 4 is a diagram illustrating example intersection features, according to one embodiment.

As discussed above, one example of a feature that is labeled in images includes but is not limited to ground control points. Ground control points can be particularly challenging for human labelers to label accurately because they are often based on intersection features that look similar from different perspectives. FIG. 4 is a diagram illustrating example intersection features that can be found at a typical intersection, according to one embodiment. The example of FIG. 4 illustrates a schematic drawing of a typical intersection 400 at which intersection features created by various geometries of the lane lines, crosswalks, bus stops, and/or any other identifiable object or marking found at the intersection 400. An intersection refers, for instance, to a geographic area at which two or more road segments intersect, converge, and/or diverge. As shown, intersection features in the category of curvilinear geometry include but are not limited to:

(1) Points 401a-401c at which a lane boundary (e.g., lane line or marking) meets a crosswalk;
(2) Points 403a and 403 that correspond to the corners of road markings indicating a bus stop;
(3) Points 405a-405d that correspond to the corners of a crosswalk;
(4) Points 407a and 407b that are the top of gore points touching a crosswalk or limit lines (e.g., lines designating the limit or boundaries of other features such as lanes); and
(5) Point 409 at which a limit line meets a lane boundary.

The intersection features identified above typically meet the criteria or properties for being classified as ground control points.

In one embodiment, the intersection feature/ground control point is selected so that the intersection feature is uniquely identifiable from among other intersection features from the category of curvilinear geometry intersection features (e.g., see designated property item (2) above). In other words, a single feature should only be classified under one feature definition category. For example, if a feature that is classified as "a lane boundary with a crosswalk" should also not satisfy the definition for being a "gore point" or vice versa.

In another embodiment, the intersection feature is selected based on determining that the intersection feature has a spatial sparsity that meets a sparsity criterion (e.g., see designated property item (3) above). Features that repeat often within a designated area (i.e., not sparse or appear in numbers greater than the sparsity threshold) are not well suited as ground control points because they can be more difficult to uniquely identify and match as against known ground control points. For example, features such as dashes of a lane line, stripes in a crosswalk, multiple line paint intersections in restricted zones, zebra stripes, etc. that repeat often over small distances can be poor ground control point candidates.

Figure 5A:
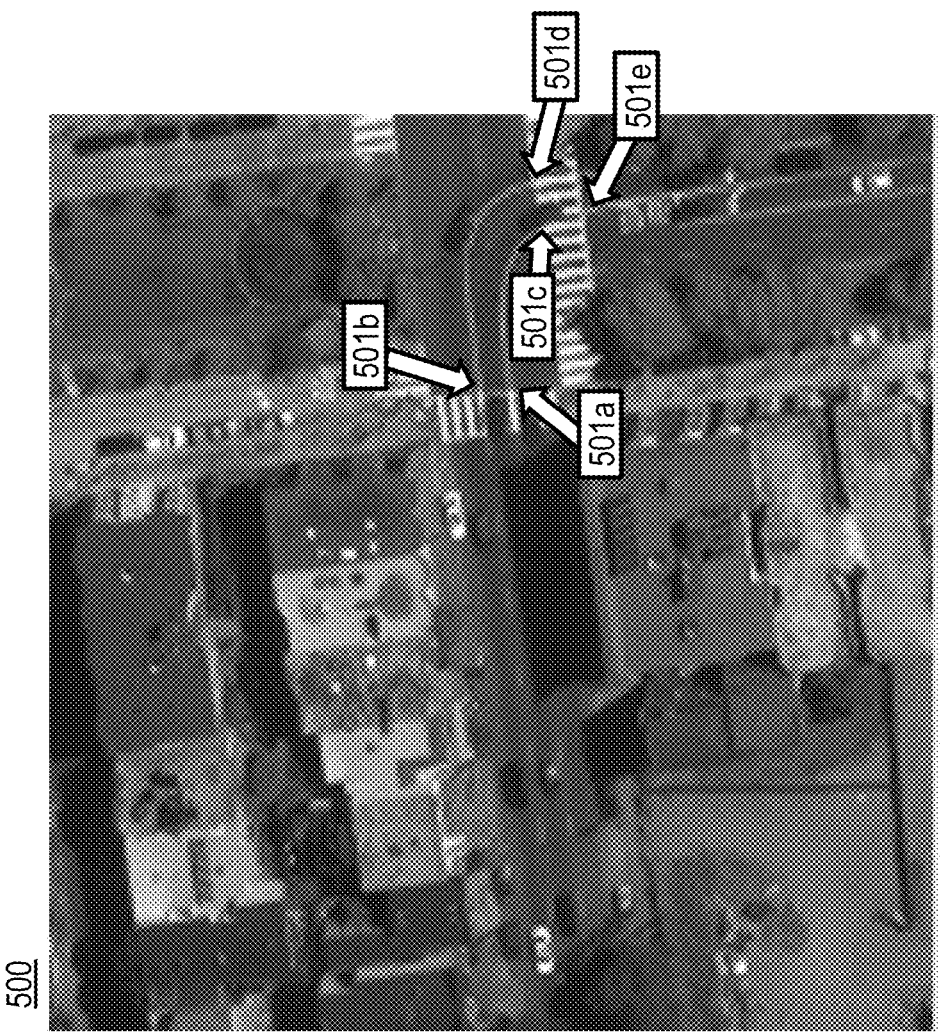
FIGS. 5A-5C are diagrams illustrating example imagery of intersection features, according to one embodiment.
Figure 5B:
Figure 5C:

FIGS. 5A-5C illustrate example imagery of some of the intersection features illustrated in FIG. 4, according to one embodiment. For example, FIG. 5A illustrates top-down imagery 500 that depicts ground control points 501a-501e at which a lane boundary meets a crosswalk. FIG. 5B illustrates to-down imagery 520 that depicts ground control points 521a and 521b that are crosswalk corners. FIG. 5C illustrates top-down imagery 540 that depicts ground control points 541a and 541b at which a limit line meets a lane line. Each of the ground control points illustrated in FIGS. 5A-5C are an intersection features from a category of curvilinear geometry intersection features that are a visible feature of a roadway intersection (e.g., visible from a top-down imagery perspective).

Figure 6A:
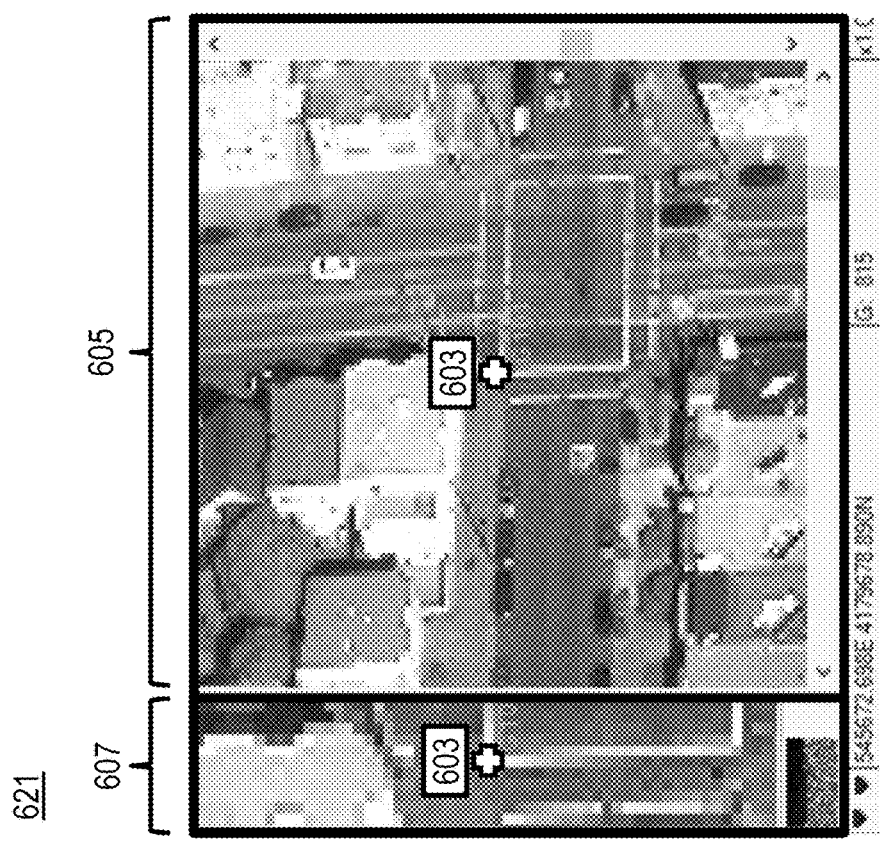
FIGS. 6A and 6B are diagrams illustrating multiple images of the same intersection feature, according to one embodiment.
Figure 6B:
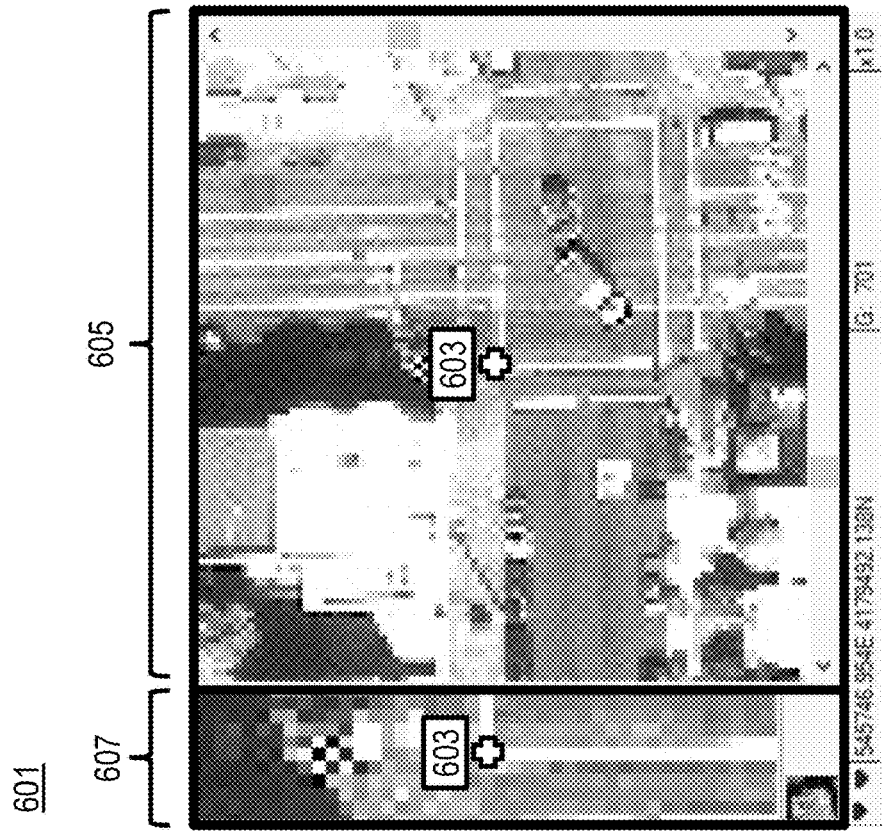

FIGS. 6A and 6B are diagrams illustrating multiple images of the same intersection feature, according to one embodiment. In this example, FIG. 6A illustrates a first top-down image 601 that depicts an intersection with a crosswalk corner 603 in a main view 605 and a zoomed view 607, and FIG. 6B illustrates a second top-down image 621 of the same intersection with the crosswalk corner 603 in the main view 605 and the zoomed view 607 captured at a different time. In one embodiment, because the ground control point images can originate from any number of sources, the resolution, quality, etc. of each image can vary. For example, the resolution of top imagery of different satellites or other aerial sources can vary depending on the kind of camera sensors used. These different sensors then produce images with different resolutions.

Figure 7A:
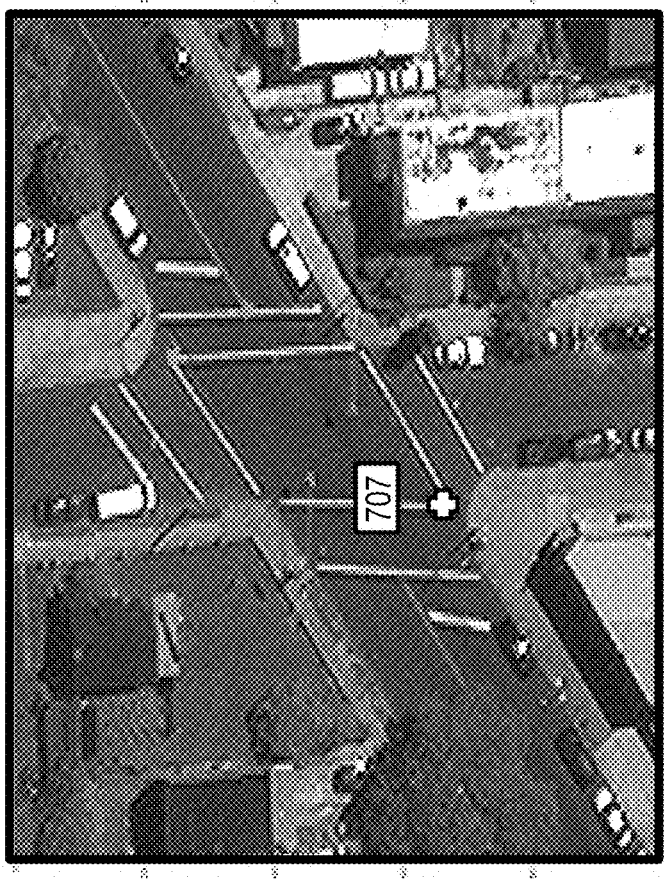
FIGS. 7A-7B are diagrams illustrating examples of single view imagery of intersection features, according to one embodiment.
Figure 7B:
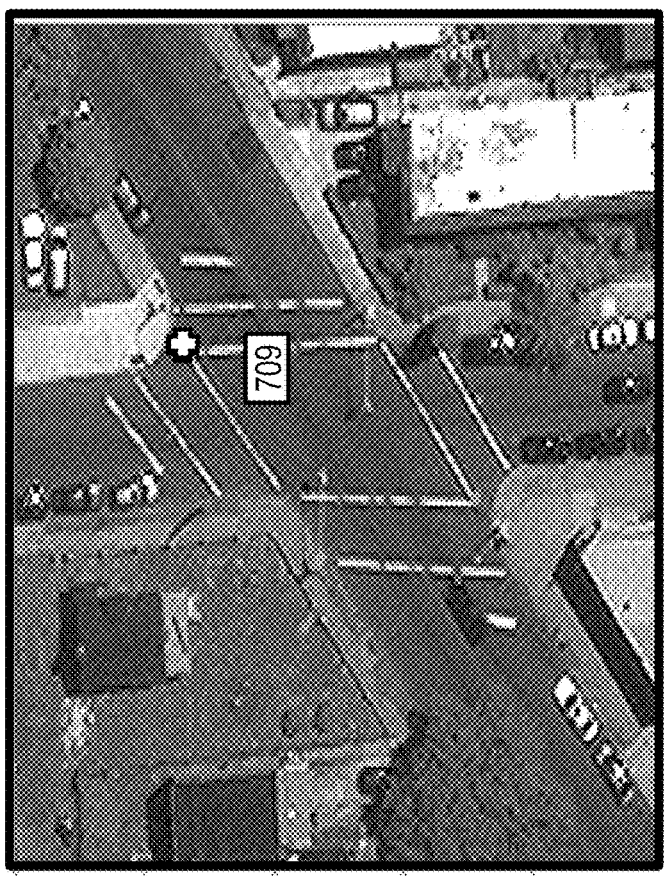

FIG. 7A-7B are diagrams illustrating examples of single view imagery of intersection features, according to one embodiment. In this example, 7A illustrates a first top-down image 701 that depicts an intersection and FIG. 7B illustrates a second top-down image 703 of the same intersection at a different time. The true ground control point is ground control point 707. At such a complicated intersection it is possible a labeler could mistakenly label the true ground control point 707 at ground control point label 709 instead of at its actual location because how similar the two locations appear. Performing a feature corresponding or bundle adjustment of such a mislabeled image will likely result in an outlying residual error for the computed 3D location of the ground control point 707 that would not match well with its true known location. This is but one example of when an automated quality assessment would be needed.

Figure 8B:
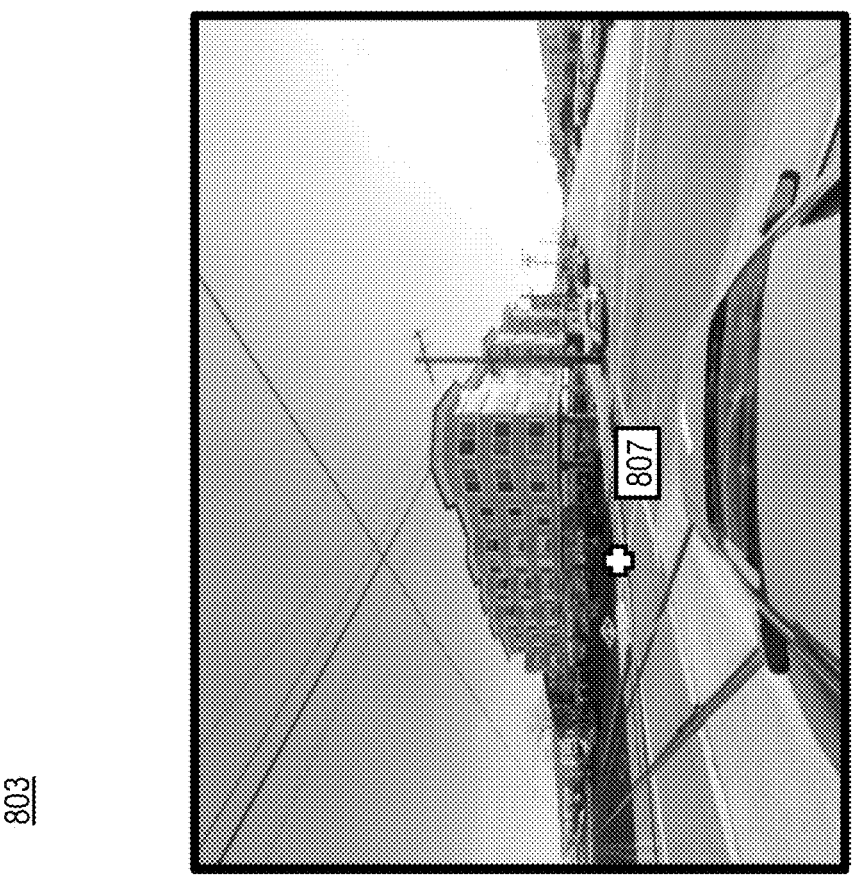
FIGS. 8A-8B are diagrams illustrating examples of multiple view imagery of intersection features, according to one embodiment.
Figure 8A:
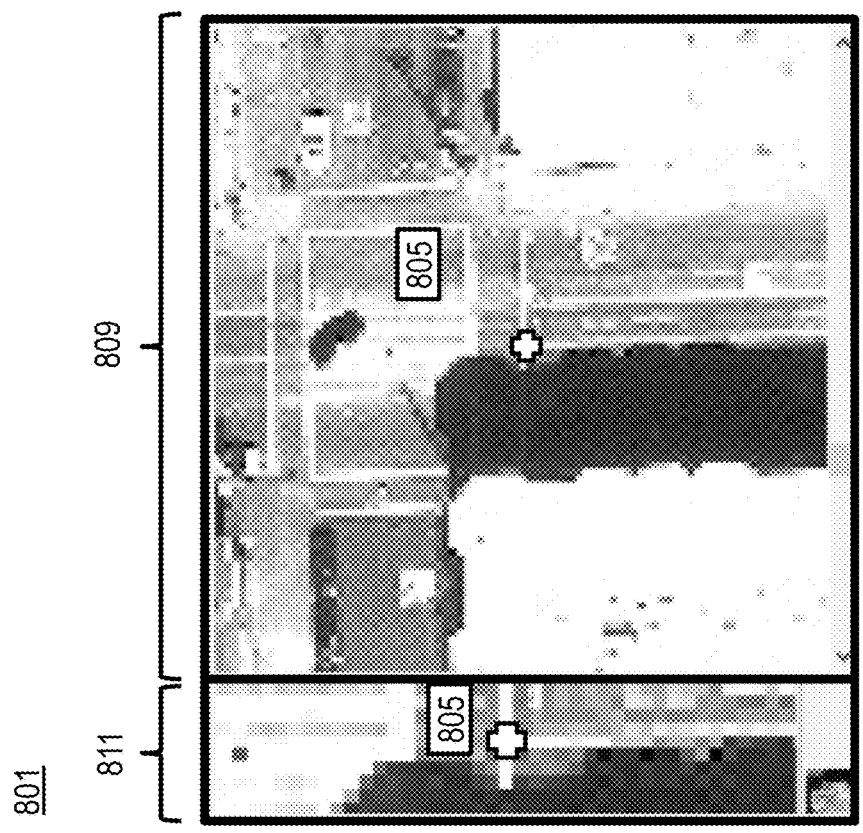

FIGS. 8A-8B are diagrams illustrating multiple view imagery of intersection features, according to one embodiment. Single views are viewpoints of the same type (i.e., between several street-level images or between several satellite images) while multiple views are viewpoints of different types (i.e., between satellite and street-level images). In this example, FIG. 8A illustrates a top-down image 801 that depicts an intersection in a main view 809 and a zoomed view 811, and FIG. 8B illustrates a street level image 803 of the same intersection captured at a different time. The annotation of the location of the feature becomes even more challenging when the two images are different viewpoints. The labeler, whether a human or automated system, has to distinguish between two widely different viewpoints using buildings, street patterns, and other such landmarks. The labeler marked the true ground control point as points 805 and 807. This may appear correct but upon closer expectation the ground control points 807 and 805 are not the same. These errors are difficult to detect and have a large negative impact on triangulated 3D coordinates. This is another example of when an automated quality assessment would be needed.

Figure 9A:
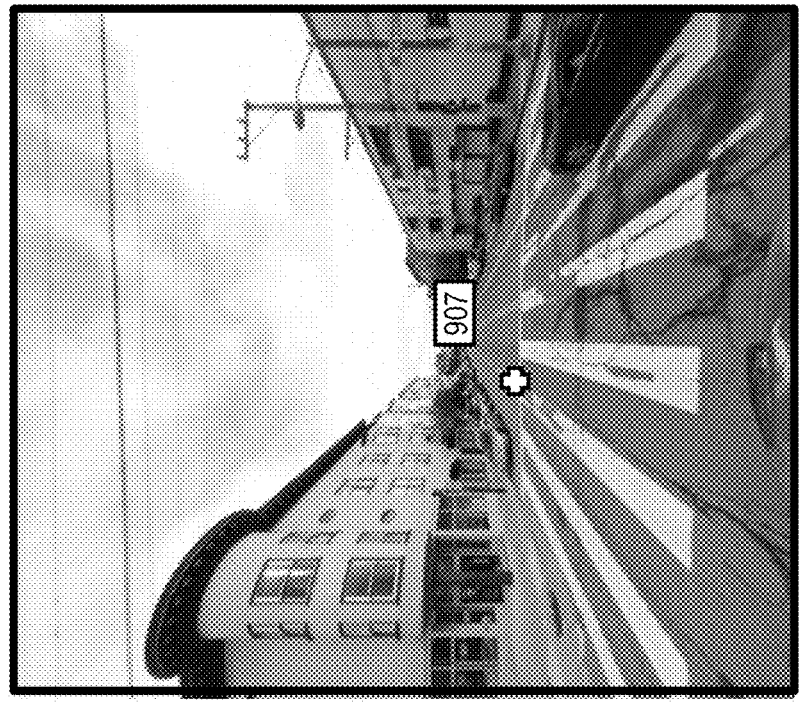
FIGS. 9A-9D are diagrams illustrating examples of multiple view imagery of intersection features, according to one embodiment.
Figure 9B:
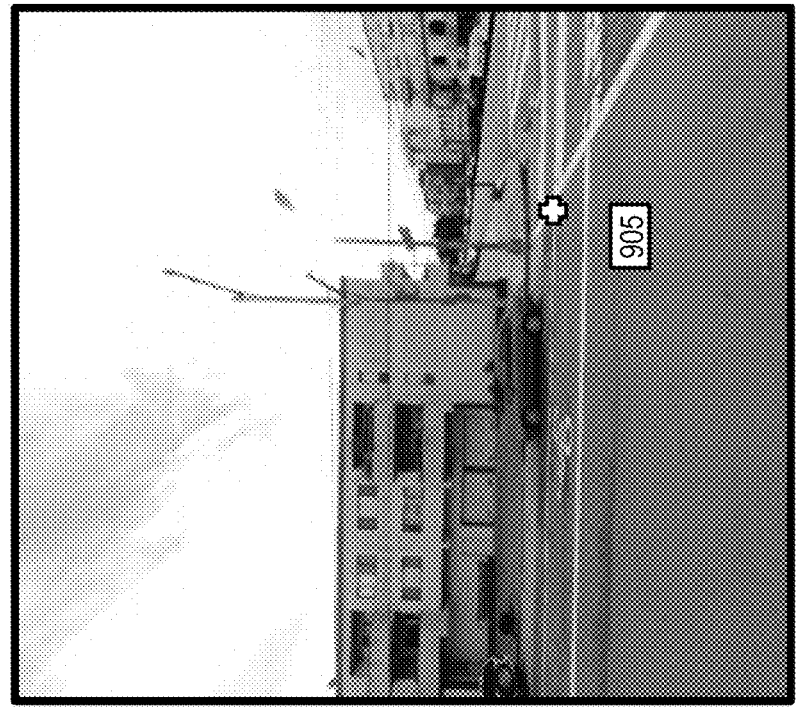
Figures 9C, 9D:
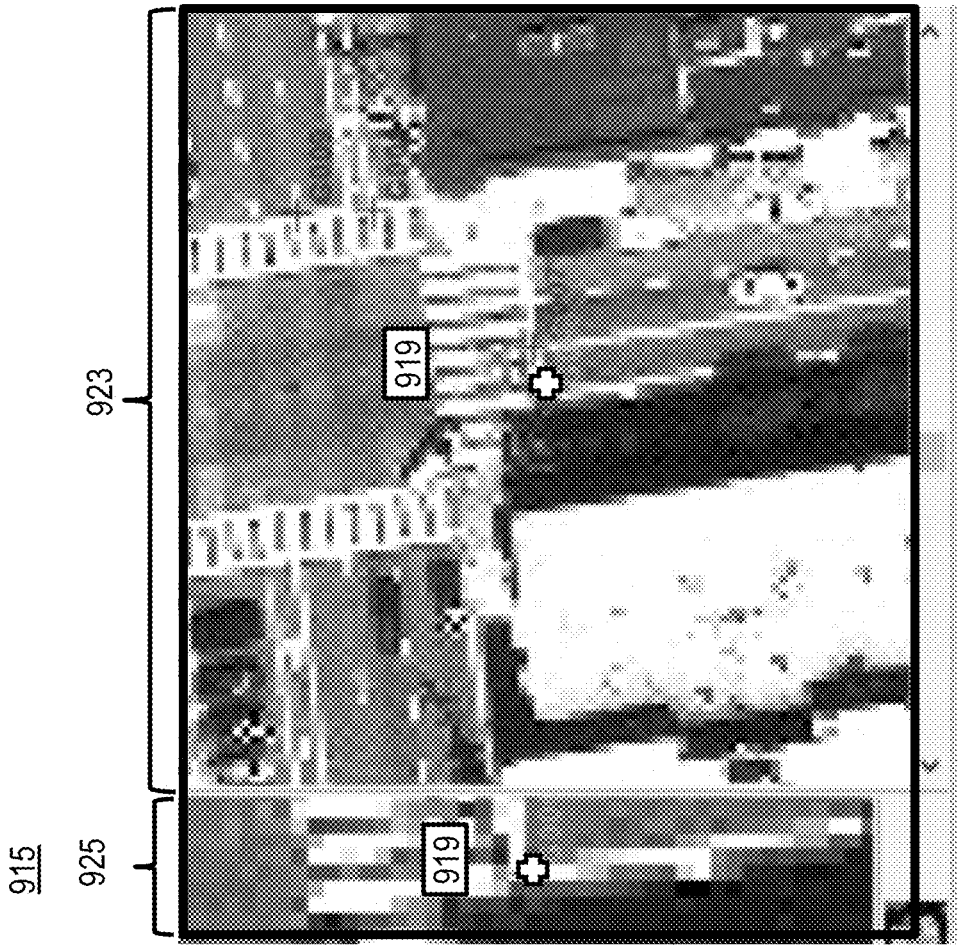

FIGS. 9A-9D are diagrams illustrating multiple view imagery of intersection features, according to one embodiment. In this example, 9A illustrates a first street-level image 901, FIG. 9B illustrates a second street-level image 903 of the same intersection at a different time, and FIG. 9C illustrates a top-down image 915 that depicts the same intersection in a main view 923 and a zoomed view 925 at a different time. The labeler marked the ground control points of images 901, 903, and 915 as points 905, 907, and 919 respectively. To determine if the designated ground control points are accurate the bundle adjustment module 203 uses the bundle adjustment process, discussed above, to determine the residual error of ground control points 905, 907, and 919.

The bundle adjustment module 203 determines that the residual error of ground control point 907 is greater than the error threshold. Therefore, ground control point 907 is flagged for further investigation. In one embodiment, in addition to flagging ground control point 907 as incorrect, the bundle adjustment module 203 projects the incorrect ground control point 907 to a different viewpoint to allow for easier verification. For example, the flagged ground control point 907 is depicted in a second street-level image 903. The bundle adjustment module 203 projects the flagged ground control point 907 onto a top-down image 917 for easier comparison. FIG. 9D illustrates a 3D high-resolution georeferenced top-down image 917 of a projected ground control point 921. Flagged ground control point 907 is projected in the top-down image 917 as projected ground control point 921. The projection is done using the flagged ground control point and the camera parameter data from the camera, which took the second street-level image 903. Using this information, the bundle adjustment module 203 is able to project a 3D position of the flagged ground control point 907 into a high-resolution top down image 917. The high-resolution projection allows for easy comparison between ground control points in the same view type. From the projected top-down image 917, it is much easier to confirm that the projected ground control point 921 is inconsistent with ground control point 919.

Figure 10A:
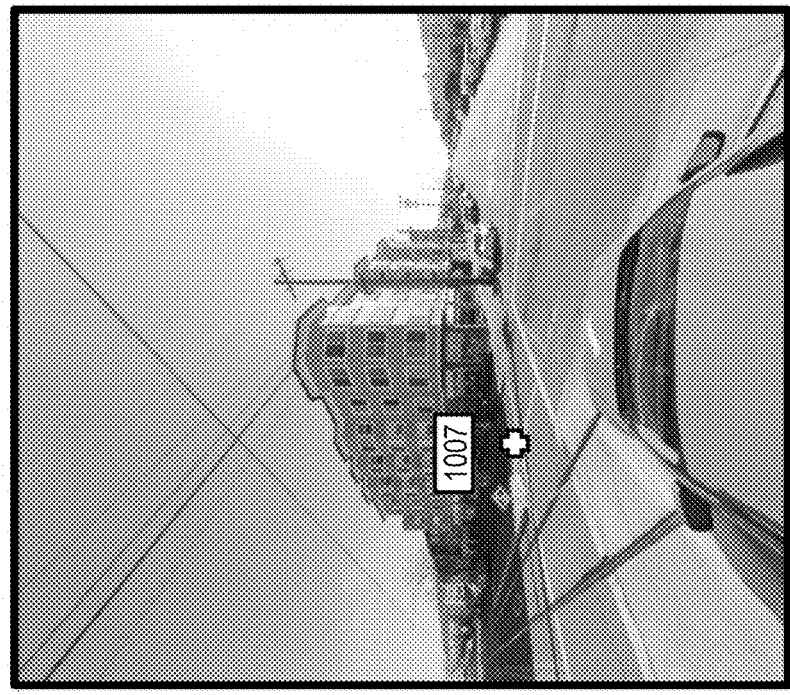
FIGS. 10A-10E are diagrams illustrating examples of multiple view imagery of intersection features, according to one embodiment.
Figure 10B:
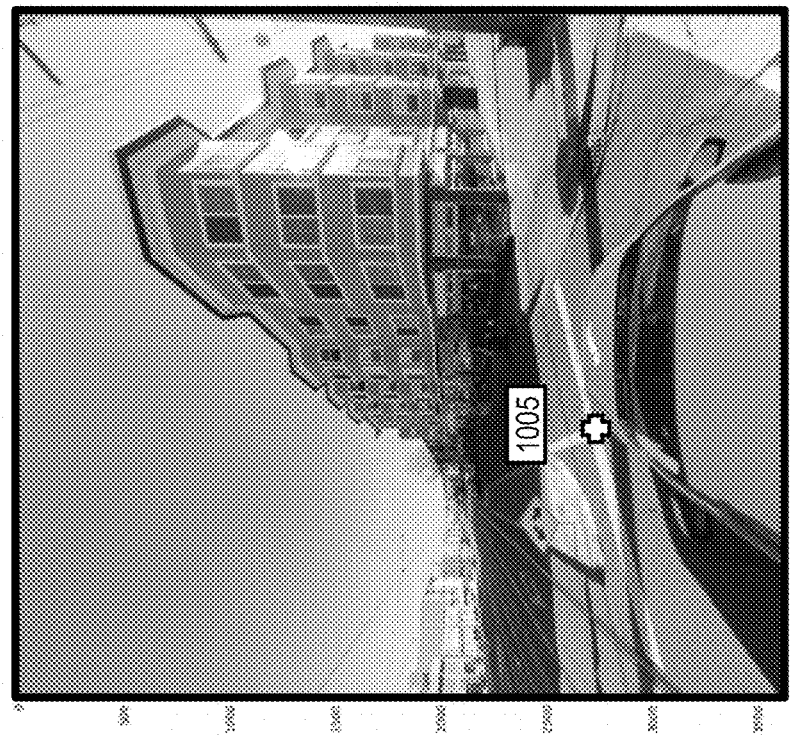
Figure 10D:
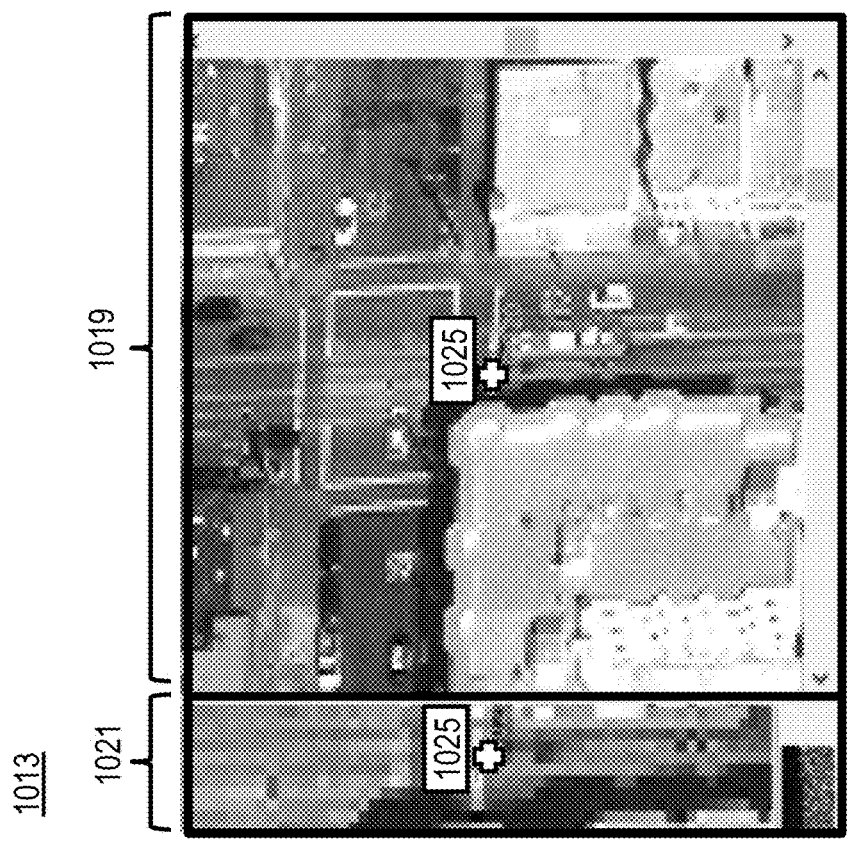
Figure 10C:
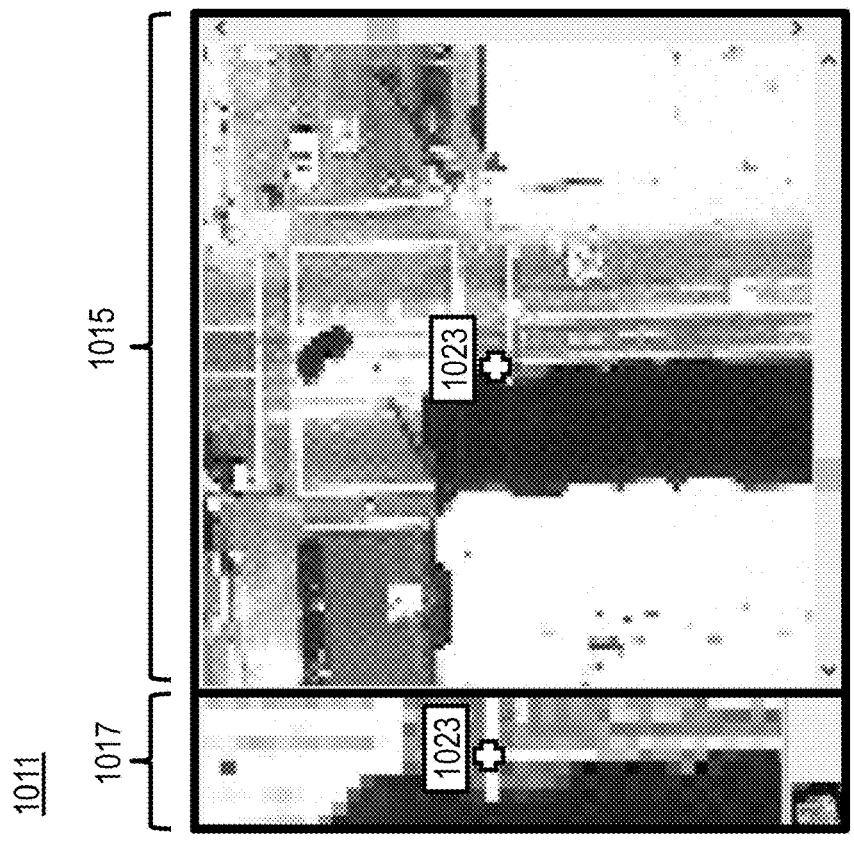

FIGS. 10A-10E are diagrams illustrating multiple view imagery of intersection features, according to one embodiment. In this example, 10A illustrates a first street-level image 1001, FIG. 10B illustrates a second street-level image 1003 of the same intersection at a different time, FIG. 10C illustrates a first top-down image 1011 that depicts the same intersection in a first main view 1015 and a first zoomed view 1017 at a different time, and FIG. 10D illustrates a second top-down image 1013 that depicts the same intersection in a second main view 1019 and a second zoomed view 1021 at a different time. The labeler marked the ground control points of images 1001, 1003, 1011, and 1013 as points 1005, 1007, 1023, and 1025 respectively. To determine if the designated ground control points are accurate the bundle adjustment module 203 uses the bundle adjustment process to determine the residual error of ground control points 1005, 1007, 1023, and 1025. The bundle adjustment module 203 determines that the residual error of the designated ground control points between single views are not greater than the error threshold. For example, residual error between ground control point 1005 and ground control point 1007 (both taken from street-level images) is not greater than the error threshold and residual error between ground control point 1023 and ground control point 1025 (both taken from top-down images) is not greater than the error threshold. However, the residual error between the ground control points of different views is greater than the threshold (i.e., residual error between street-level ground control points 1005 and 1007 and top-down ground control points 1023 and 1025).

Figure 10E:

Therefore, ground control points 1005 and 1007 are flagged for further investigation. In one embodiment, in addition to flagging ground control points 1005 and 1007 as incorrect, the bundle adjustment module 203 projects the incorrect ground control points 1005 and 1007 to a top-down viewpoint as discussed above to allow for easier verification. FIG. 10E illustrates a 3D high-resolution georeferenced top-down image 1031 of a projected ground control point 1033. In one embodiment, flagged ground control point 1005 is projected in the top-down image 1031 as projected ground control point 1033. The high-resolution projection allows for easy comparison between ground control points in the same view type. From the projected top-down image 1031, it is much easier to confirm that the projected ground control point 1033 is inconsistent with ground control points 1023 and 1025.

In another embodiment ground control points 1023 and 1025 are flagged for further investigation. Ground control points 1023 and 1025 are projected onto a street-level viewpoint for easier verification. The high-resolution projection allows for easy comparison between ground control points in the same view type. From the projected street-level viewpoint (not shown), it is much easier to confirm that the projected ground control point is inconsistent with ground control points 1005 and 1007.

Figure 11B:
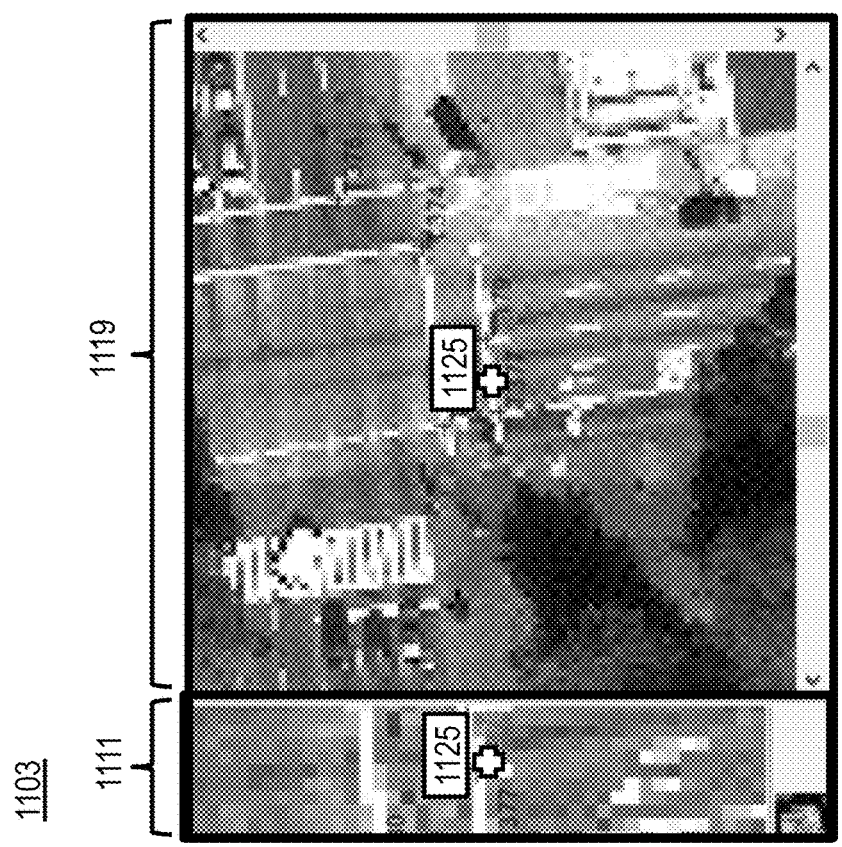
FIGS. 11A-11C are diagrams illustrating examples of multiple view imagery of intersection features, according to one embodiment.
Figure 11A:
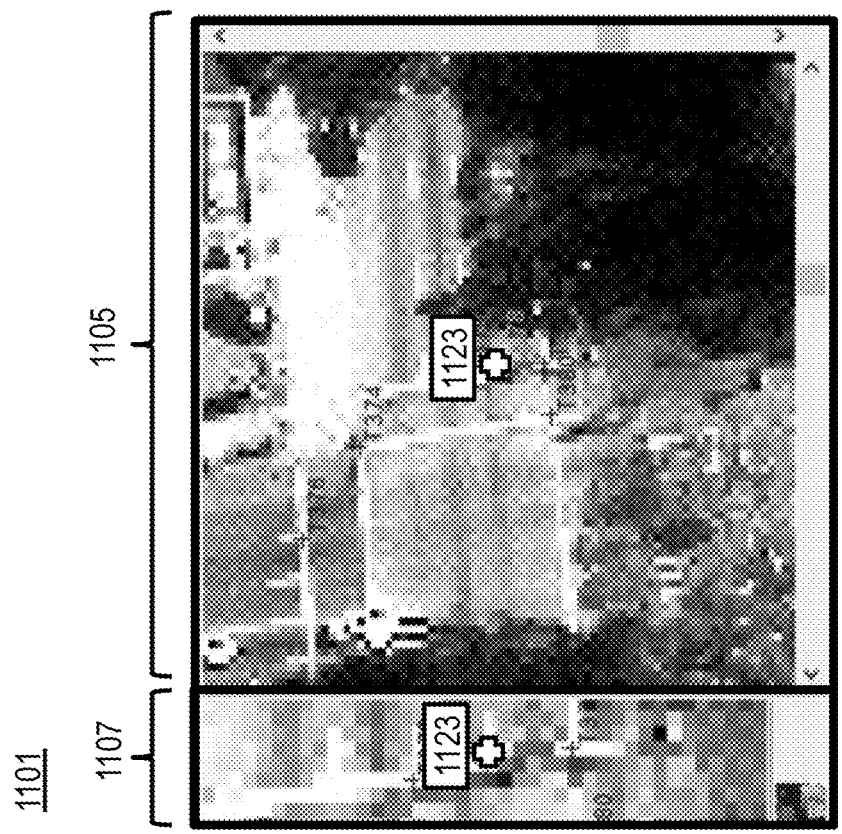
Figure 11C:
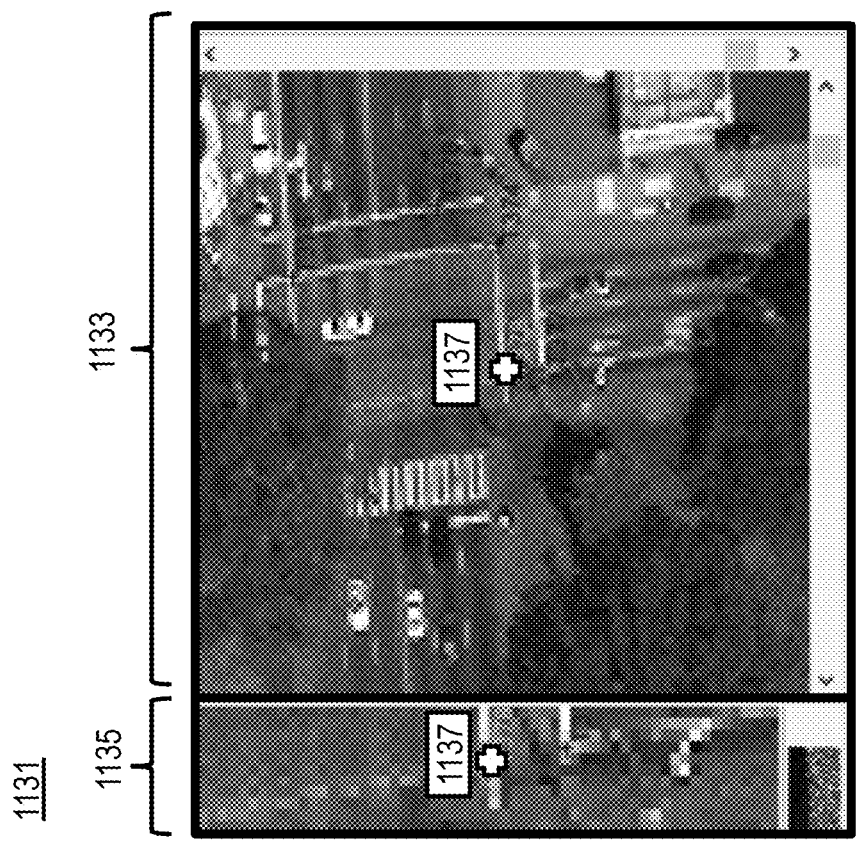

FIGS. 11A-11C are diagrams illustrating multiple view imagery of intersection features, according to one embodiment. In this example, FIG. 11A illustrates a first top-down image 1101 that an intersection in a first main view 1105 and a first zoomed view 1107, and FIG. 11B illustrates a second top-down image 1103 that depicts the same intersection in a second main view 1119 and a second zoomed view 1111 at a different time, and FIG. 11C illustrates a third top-down image 1131 that depicts the same intersection in a third main view 1133 and a third zoomed view 11351 at a different time. The intersection depicted has a complicated line intersection structure that makes it extremely difficult to accurately label the ground control points. In addition to the complicated intersection structure, the first top-down image 1101 is rotated with respect to the second top-down image 1103 and third top-down image 1131, further complicating the labeling process. The labeler marked the ground control points of images 1101, 1103, and 1131 as points 1123, 1125, and 1137 respectively. To determine if the designated ground control points are accurate the bundle adjustment module 203 uses the bundle adjustment process to determine the residual error of ground control points 1123, 1125, and 1137. The bundle adjustment module 203 determines that the residual error of ground control point 1137 is greater than the error threshold. Therefore, ground control point 1137 is flagged for further investigation.

Returning to FIG. 1, as shown, the system 100 includes the quality assessment system 107 which incorporates the annotated image module for determining ground control points from image data according to the various embodiments described herein. In addition, the annotated image module 203 can be configured to use machine learning to detect objects or features (e.g., intersection features) depicted in images that can be used as ground control points. For example, with respect to autonomous, navigation, mapping, and/or other similar applications, the annotated image module can detect ground control points in input images and generate ground control point data (e.g., location data) and associated prediction confidence values/uncertainties, according to the various embodiments described herein. In one embodiment, the quality assessment system 107 includes a neural network or other machine learning system to make predictions from machine learning models. For example, when the input to the machine learning model are images used for visual odometry, the features of interest can include ground control points detected in the images to support localization of, e.g., a vehicle 101 or other similar applications within the sensed environment. In one embodiment, the neural network of the quality assessment system 107 is a traditional convolutional neural network, which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the quality assessment system 107 also has connectivity or access to a geographic database 105 which stores the learned ground control points generated according to the embodiments described herein. In one embodiment, the geographic database 105 includes representations of mapped ground control points and related geographic features to facilitate visual odometry to increase localization accuracy. In one embodiment, the quality assessment system 107 has connectivity over a communication network 119 to the services platform 111 that provides one or more services 113. By way of example, the services 113 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 113 uses the output of the quality assessment system 107 (e.g., ground control point data) to localize the vehicle 101 or UE 115 (e.g., a portable navigation device, smartphone, portable computer, tablet, etc.) to provide services 113 such as navigation, mapping, other location-based services, etc.

In one embodiment, the quality assessment system 107 may be a platform with multiple interconnected components. The quality assessment system 107 may include multiple servers, intelligent networking devices, computing devices, components and corresponding software for providing parametric representations of lane lines. In addition, it is noted that the quality assessment system may be a separate entity of the system 100, a part of the one or more services 113, a part of the services platform 111, or included within the UE 115 and/or vehicle 101.

In one embodiment, content providers 121a-121m (collectively referred to as content providers 121) may provide content or data (e.g., including geographic data, parametric representations of mapped features, etc.) to the geographic database 105, the quality assessment system 107, the services platform 111, the services 113, the UE 115, the vehicle 101, and/or an application 117 executing on the UE 115. The content provided may be any type of content, such as map content, textual content, audio content, video content, image content, etc. In one embodiment, the content providers 121 may provide content that may aid in the detecting and classifying of lane lines and/or other features in image data and estimating the quality of the detected features. In one embodiment, the content providers 121 may also store content associated with the geographic database 105, quality assessment system 107, services platform 111, services 113, UE 115, and/or vehicle 101. In another embodiment, the content providers 121 may manage access to a central repository of data, and offer a consistent, standard interface to data, such as a repository of the geographic database 105.

In one embodiment, the UE 115 and/or vehicle 101 may execute a software application 117 to capture image data or other observation data for determining ground control points or using ground control points according the embodiments described herein. By way of example, the application 117 may also be any type of application that is executable on the UE 115 and/or vehicle 101, such as autonomous driving applications, mapping applications, location-based service applications, navigation applications, content provisioning services, camera/imaging application, media player applications, social networking applications, calendar applications, and the like. In one embodiment, the application 117 may act as a client for the quality assessment system 107 and perform one or more functions associated with determining ground control points from image data alone or in combination with the quality assessment system 107.

By way of example, the UE 115 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 115 can support any type of interface to the user (such as "wearable" circuitry, etc.). In one embodiment, the UE 115 may be associated with the vehicle 101 or be a component part of the vehicle 101.

In one embodiment, the UE 115 and/or vehicle 101 are configured with various sensors for generating or collecting environmental image data (e.g., for processing quality assessment system 107), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 115 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 115 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 115 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the quality assessment system 107, services platform 111, services 113, UE 115, vehicle 101, and/or content providers 121 communicate with each other and other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
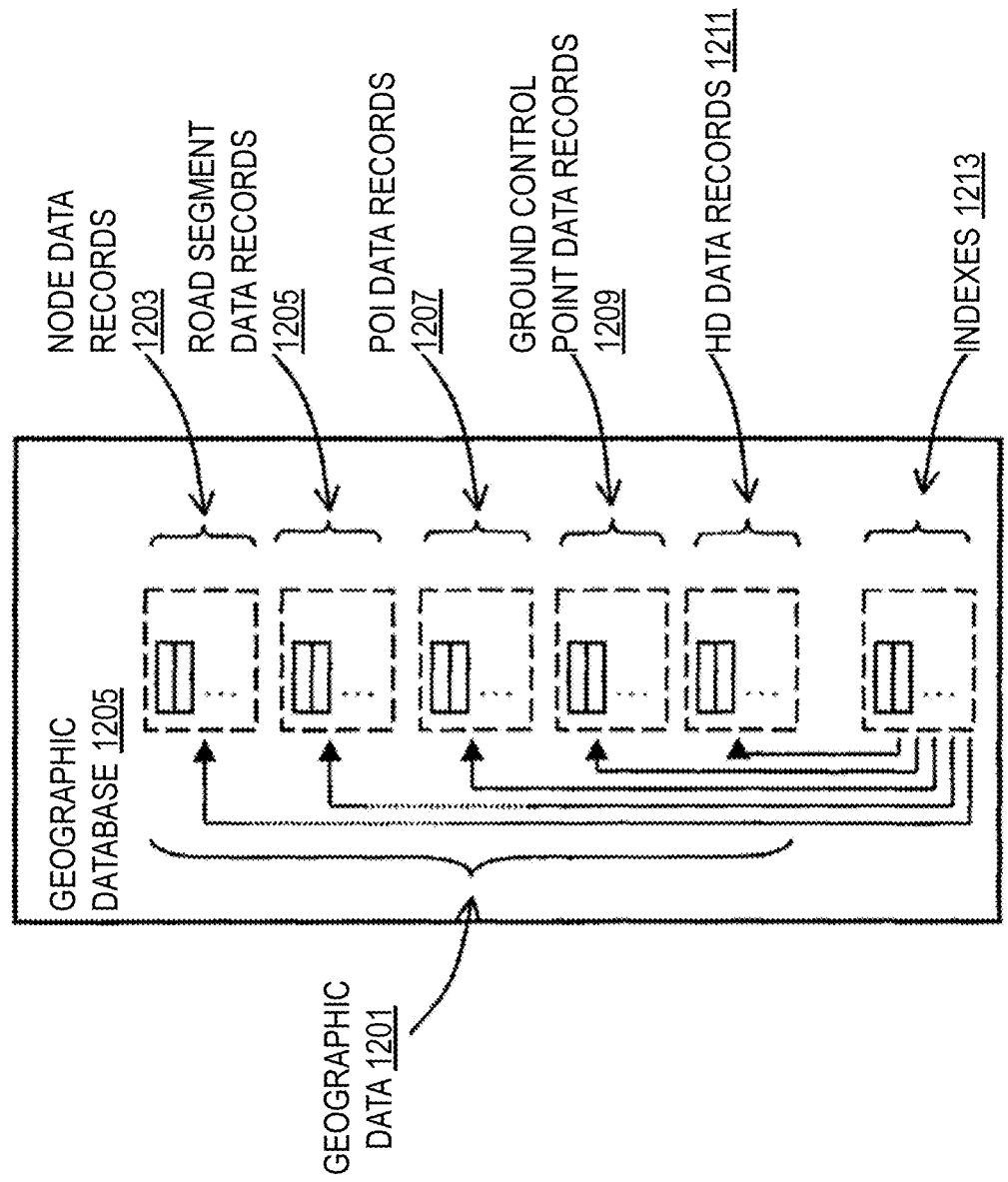
FIG. 12 is a diagram of a geographic database, according to one embodiment.

FIG. 12 is a diagram of a geographic database, according to one embodiment. In one embodiment, the geographic database 105 includes geographic data 1201 used for (or configured to be compiled to be used for) mapping and/or navigation-related services, such as for video odometry based on the mapped features (e.g., lane lines, road markings, signs, etc.). In one embodiment, the geographic database 105 includes high resolution or high definition (HD) mapping data that provide centimeter-level or better accuracy of map features. For example, the geographic database 105 can be based on Light Detection and Ranging (LiDAR) or equivalent technology to collect billions of 3D points and model road surfaces and other map features down to the number lanes and their widths. In one embodiment, the HD mapping data (e.g., HD data records 1211) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1203, road segment or link data records 1205, POI data records 1207, ground control point data records 1209, HD mapping data records 1211, and indexes 1213, for example. More, fewer or different data records can be provided. In one embodiment, additional data records (not shown) can include cartographic ("carto") data records, routing data, and maneuver data. In one embodiment, the indexes 1213 may improve the speed of data retrieval operations in the geographic database 105. In one embodiment, the indexes 1213 may be used to quickly locate data without having to search every row in the geographic database 105 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1207. The geographic database 105 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 105 can also include ground control point data records 1209 for storing the ground control point data, learnable map features, as well as other related data used according to the various embodiments described herein. In addition, the ground control point data records 1209 can also store ground truth training and evaluation data, machine learning models, annotated observations, and/or any other data generated or used by the system 100 according to the various embodiments described herein. By way of example, the ground control point data records 1209 can be associated with one or more of the node records 1203, road segment records 1205, and/or POI data records 1207 to support localization or visual odometry based on the features stored therein and the corresponding estimated quality of the features. In this way, the records 1209 can also be associated with or used to classify the characteristics or metadata of the corresponding records 1203, 1205, and/or 1207.

In one embodiment, as discussed above, the HD mapping data records 1211 model road surfaces and other map features to centimeter-level or better accuracy. The HD mapping data records 1211 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1211 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 1211 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1211.

In one embodiment, the HD mapping data records 1211 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 105 can be maintained by the content provider 121 in association with the services platform 111 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 115) along roads throughout the geographic region to observe features and/or record information about them, for example. Also, remote sensing, such as aerial or satellite photography, can be used.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining ground control points from image data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
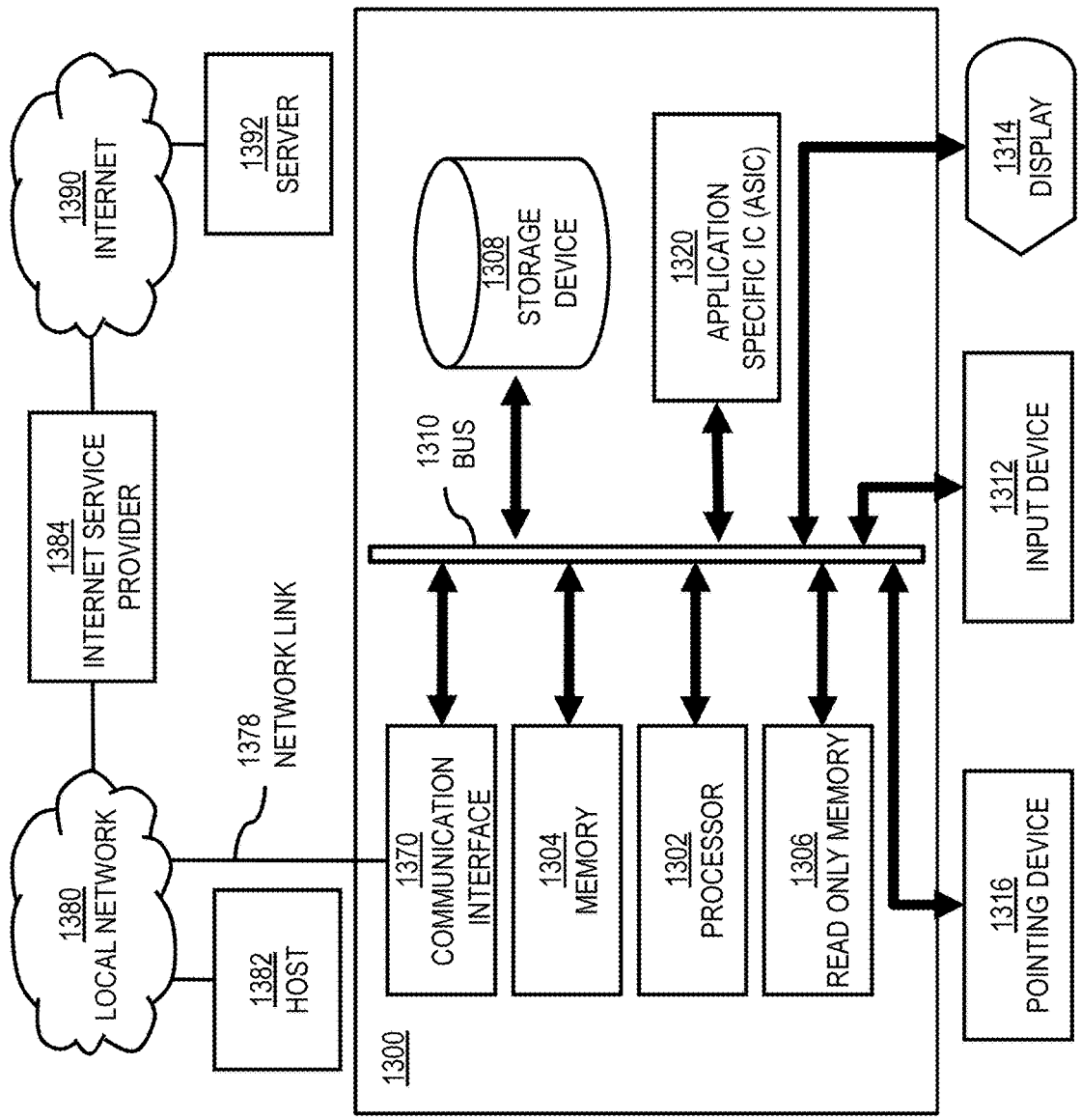
FIG. 13 is a diagram of hardware that can be used to implement an embodiment.

FIG. 13 illustrates a computer system 1300 upon which an embodiment of the invention may be implemented. Computer system 1300 is programmed (e.g., via computer program code or instructions) to determine ground control points from image data as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to determining ground control points from image data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for determining ground control points from image data. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1000 is turned off or otherwise loses power.

Information, including instructions for determining ground control points from image data, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 119 for determining ground control points from image data.

The term computer-readable medium is used herein to refer to any medium that participates in providing information to processor 1302, including instructions for execution. Such a medium may take many forms, including, but not limited to, non-volatile media, volatile media and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 14 illustrates a chip set 1400 upon which an embodiment of the invention may be implemented. Chip set 1400 is programmed to determine ground control points from image data as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to determine ground control points from image data. The memory 1405 also stores the data associated with or generated by the execution of the inventive steps.

Figure 15:
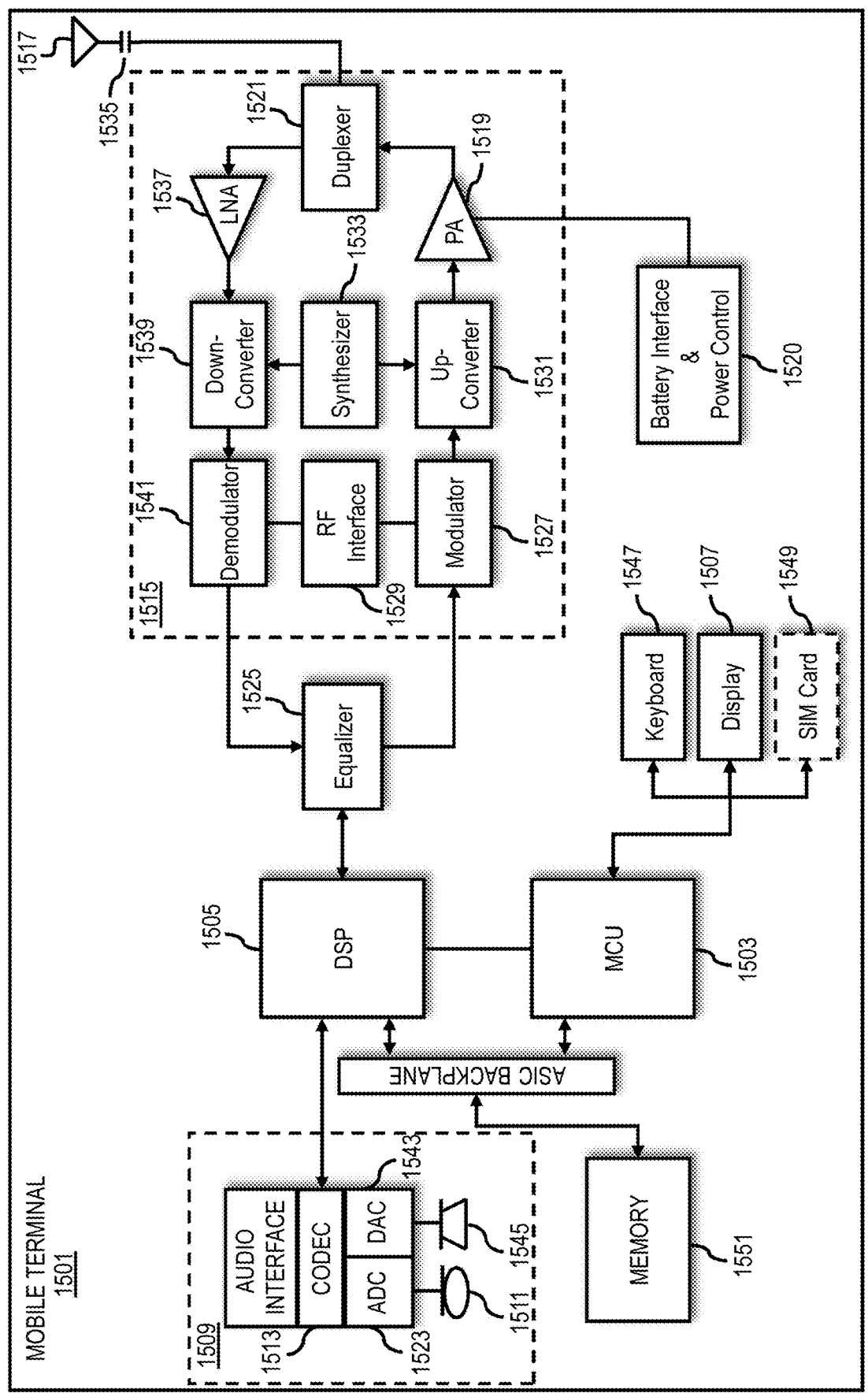
FIG. 15 is a diagram of a mobile terminal (e.g., handset) that can be used to implement an embodiment.

FIG. 15 is a diagram of exemplary components of a mobile terminal (e.g., UE 115 or embedded component of the vehicle 101) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to determine ground control points from image data. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing quality assurance of annotated image data comprising:
   retrieving a plurality of annotated images that are labeled with one or more feature correspondence labels;
   performing a bundle adjustment process on the plurality of annotated images to compute a three-dimensional (3D) location and a residual error of a feature corresponding to the one or more feature correspondence labels, wherein the bundle adjustment process minimizes an error range of a two-dimensional (2D) projection of the feature into each of the plurality of annotated images based on the computed 3D location, and wherein the residual error is based on the minimized error range; and
   flagging the one or more feature correspondence labels as potentially incorrect based on determining that the residual error is greater than an error threshold.

2. The method of claim 1, further comprising:
   providing the flagged one or more feature correspondence labels as an output for performing quality assurance on the plurality of annotated images.

3. The method of claim 1, further comprising:
   determining an image from among the plurality of annotated images as a source of the residual error by computing and comparing respective residual errors for one or more subsets of the plurality of annotated images.

4. The method of claim 1, wherein the feature is a ground control point.

5. The method of claim 1, wherein the error threshold is set to a value that indicates an outlier from previously observed residual errors.

6. The method of claim 1, wherein the plurality of annotated images depicts a single view or multiple views of the feature.

7. The method of claim 6, wherein the single view, the multiple views, or a combination thereof include a street-level view, an aerial view, or a combination thereof.

8. The method of claim 1, wherein the bundle adjustment process is based on camera parameter data, and wherein the camera parameter includes a camera position, a camera orientation, a camera focal length, a camera lens characteristic, or a combination thereof.

9. The method of claim 2, wherein the output includes a mapping user interface depicting a representation of the flagged one or more feature correspondence labels, the feature, the 3D location, the residual error, or a combination thereof.

10. An apparatus for providing quality assurance of annotated image data comprising:
    at least one processor; and
    at least one memory including computer program code for one or more programs, the at least one memory and the computer program code configured to, with the at least one processor, cause the apparatus to perform at least the following:
    retrieve a plurality of annotated images that are labeled with one or more feature correspondence labels;
    perform a bundle adjustment process on the plurality of annotated images to compute a three-dimensional (3D) location and a residual error of a feature corresponding to the one or more feature correspondence labels;
    flag the one or more feature correspondence labels as potentially incorrect based on determining that the residual error is greater than an error threshold; and
    determining an image from among the plurality of annotated images as a source of the residual error by computing and comparing respective residual errors for one or more subsets of the plurality of annotated images.

11. The apparatus of claim 10, wherein the apparatus is further caused to:

provide the flagged one or more feature correspondence labels as an output for performing quality assurance on the plurality of annotated images.

12. The apparatus of claim 10, wherein the bundle adjustment process minimizes an error range of a two-dimensional (2D) projection of the feature into each of the plurality of annotated images based on the computed 3D location, and wherein the residual error is based on the minimized error range.

13. The apparatus of claim 10, wherein the feature is a ground control point.

14. A non-transitory computer-readable storage medium for providing quality assurance of annotated image data, carrying one or more sequences of one or more instructions which, when executed by one or more processors, cause an apparatus to perform:
    retrieving a plurality of annotated images that are labeled with one or more feature correspondence labels;
    performing a bundle adjustment process on the plurality of annotated images to compute a three-dimensional (3D) location and a residual error of a feature corresponding to the one or more feature correspondence labels, wherein the bundle adjustment process minimizes an error range of a two-dimensional (2D) projection of the feature into each of the plurality of annotated images based on the computed 3D location, and wherein the residual error is based on the minimized error range; and
    flagging the one or more feature correspondence labels as potentially incorrect based on determining that the residual error is greater than an error threshold.

15. The non-transitory computer-readable storage medium of claim 14, wherein the apparatus is caused to further perform:
    providing the flagged one or more feature correspondence labels as an output for performing quality assurance on the plurality of annotated images.

16. The non-transitory computer-readable storage medium of claim 14, wherein the apparatus is caused to further perform:
    determining an image from among the plurality of annotated images as a source of the residual error by computing and comparing respective residual errors for one or more subsets of the plurality of annotated images.

17. The method of claim 1, wherein the bundle adjustment process reconstructs the three-dimensional (3D) location.

\* \* \* \* \*